(12) United States Patent
Wu et al.

(10) Patent No.: US 12,075,481 B2
(45) Date of Patent: Aug. 27, 2024

(54) INTER-USER EQUIPMENT COORDINATION CONFLICT INDICATION FOR HALF-DUPLEX CONSTRAINT

(71) Applicant: QUALCOMM Incorporated, San Diego, CA (US)

(72) Inventors: Shuanshuan Wu, San Diego, CA (US); Tien Viet Nguyen, Bridgewater, NJ (US); Gabi Sarkis, San Diego, CA (US); Sourjya Dutta, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/395,350

(22) Filed: Aug. 5, 2021

(65) Prior Publication Data
US 2023/0037493 A1 Feb. 9, 2023

(51) Int. Cl.
*H04W 74/0808* (2024.01)
*H04B 17/318* (2015.01)
(Continued)

(52) U.S. Cl.
CPC ...... *H04W 74/0825* (2013.01); *H04B 17/318* (2015.01); *H04L 5/16* (2013.01); *H04W 24/08* (2013.01); *H04W 72/20* (2023.01)

(58) Field of Classification Search
CPC ............ H04W 74/0825; H04W 24/08; H04W 72/0406; H04B 17/318; H04L 5/16
See application file for complete search history.

(56) References Cited

U.S. PATENT DOCUMENTS

| 2022/0053460 A1* | 2/2022 | Yu | H04W 72/0406 |
| 2022/0232548 A1* | 7/2022 | Park | H04W 4/70 |
| 2023/0379912 A1* | 11/2023 | Ji | H04W 72/20 |

FOREIGN PATENT DOCUMENTS

| CN | 112235765 B | 4/2021 |
| WO | WO-2021207473 A1 * | 10/2021 |

(Continued)

OTHER PUBLICATIONS

Ericsson: "Mode 2 Enhancements Using Inter-UE Coordination", 3GPP TSG RAN WG1 #104b-e, R1-2103705, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 6, 2021, XP051993481, 15 Pages, Figure 1, Table 1.

(Continued)

*Primary Examiner* — Peter P Chau
(74) *Attorney, Agent, or Firm* — Loza & Loza, LLP

(57) ABSTRACT

A user equipment (UE) may sense a first transmission by a first sidelink UE and a second transmission by a second sidelink UE and send a conflict indication to at least one of the first or second sidelink UEs in response to identifying a collision between the first and second transmissions, or identifying a prospective collision based on a prospective use of respective first and second resources identified in the respective first and second transmissions. A collision or prospective collision may be detected by detecting a complete or partial overlap of the first and second transmissions or of the prospective first and second resources identified in the transmissions, or by determining that any portions of the first resource and the second resource prospectively occupy a slot common to the first and second resources, and the first sidelink UE and the second sidelink UE prospectively operate in a half-duplex mode.

28 Claims, 12 Drawing Sheets

(51) Int. Cl.
*H04L 5/16* (2006.01)
*H04W 24/08* (2009.01)
*H04W 72/20* (2023.01)

(56) References Cited

FOREIGN PATENT DOCUMENTS

| WO | WO-2022087111 | A1 | * | 4/2022 |
| WO | WO-2022199899 | A1 | * | 9/2022 |
| WO | WO-2022212460 | A1 | * | 10/2022 |
| WO | WO-2022212500 | A1 | * | 10/2022 |
| WO | 2022236686 | A1 | | 11/2022 |
| WO | WO-2022238340 | A1 | * | 11/2022 |

OTHER PUBLICATIONS

International Search Report and Written Opinion—PCT/US2022/037369—ISA/EPO—Dec. 7, 2022.

Lenovo et al., "Discussion on Inter-UE Coordination for Mode 2 Enhancements", 3GPP TSG RAN WG1 #105-e, R1-2104870, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011091, 9 Pages, Section 2.2.

Lenovo et al., "Sidelink Resource Allocation for Reliability Enhancement", 3GPP TSG RAN WG1 Meeting #104e, R1-2100767, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, KP051970513, 6 Pages, p. 2, last paragraph, paragraph [0001]—paragraph [0002].

Robert Bosch GMBH: "Discussion on Inter-UE Coordination for Sidelink Mode-2", 3GPP TSG RAN WG1 #104-e, R1-2105881, 3rd Generation Partnership Project, Mobile Competence Centre, 650, Route Des Lucioles, F-06921 Sophia-Antipolis Cedex, France, vol. RAN WG1, No. E-Meeting, May 10, 2021-May 27, 2021 May 12, 2021, XP052011770, p. 3, figure 1 section 2.2 section 2.3.

* cited by examiner

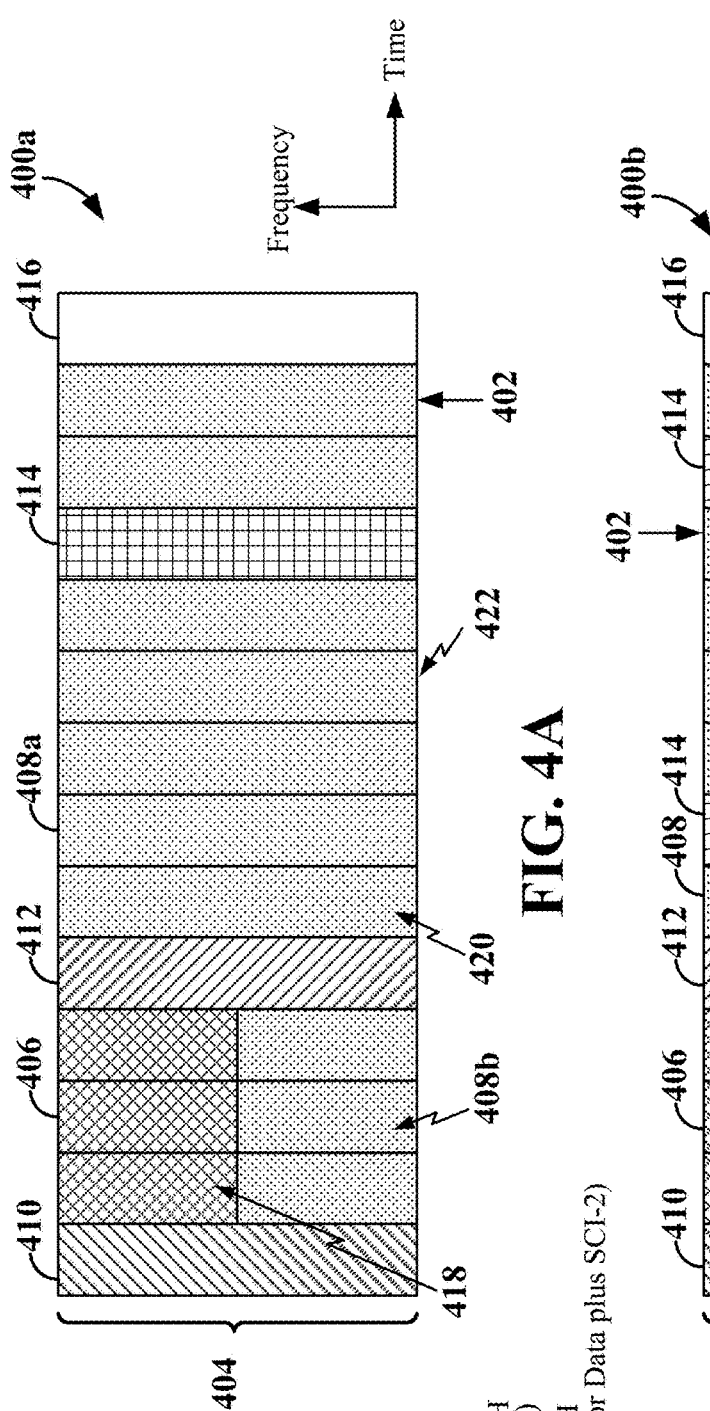
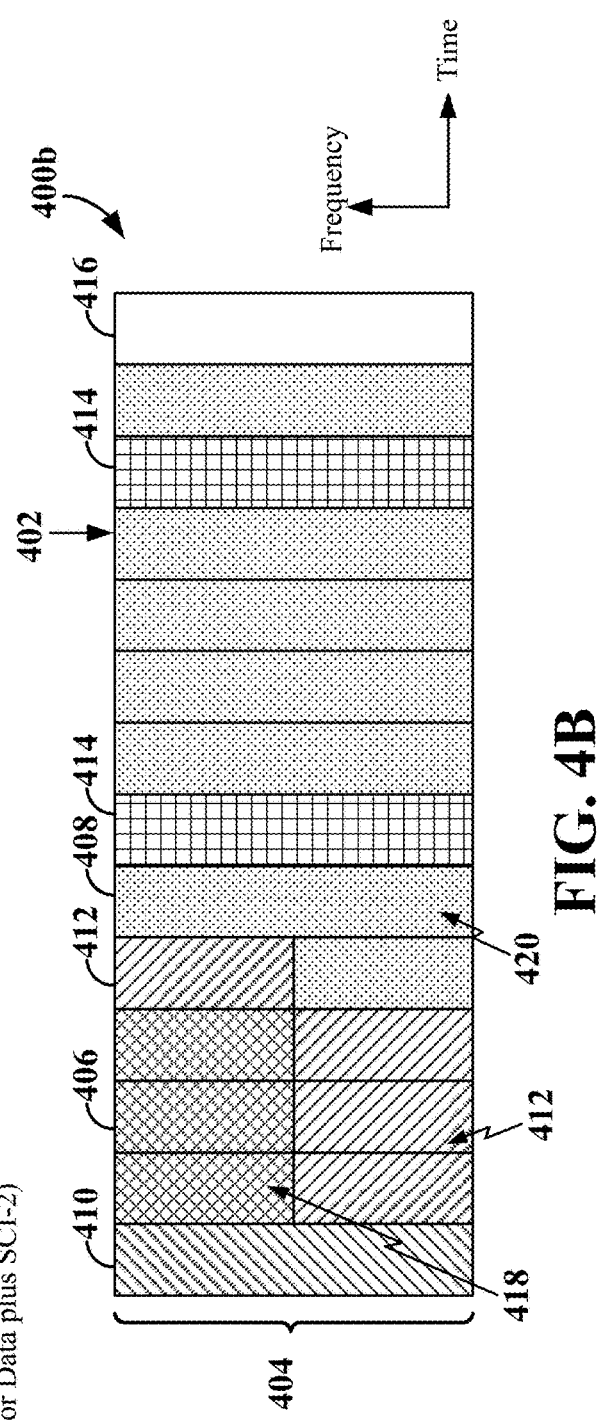
FIG. 4A
FIG. 4B

INTER-USER EQUIPMENT COORDINATION CONFLICT INDICATION FOR HALF-DUPLEX CONSTRAINT

TECHNICAL FIELD

The technology discussed below relates generally to wireless communication networks, and more particularly, to an inter-user equipment (inter-UE) coordination conflict indication for a half-duplex constraint in wireless communication systems.

INTRODUCTION

Using sidelink, user equipment (UEs) may autonomously operate when they are out of a coverage area of a base station. For example, UEs may allocate their own resources (e.g., self-schedule) and connect directly to one another without passing any communications through a base station. In some sidelink communication networks, UEs (referred to hereinafter as sidelink UEs) may communicate using half-duplex communication. In half-duplex communication, one sidelink UE may transmit while another sidelink UE receives. Sidelink may support direct communication between vehicles, pedestrians, cyclists, and infrastructure. Sidelink may be used in many applications, such as but not limited to public safety applications. For example, the UEs of public safety personnel may be in proximity to one another but do not have contact with a base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured as an assisting sidelink UE for inter-UE coordination of sidelink communications in a wireless communication network is disclosed. The UE includes a transceiver, a memory, and a processor communicatively coupled to the transceiver and the memory. In the example, the processor and the memory can be configured to: sense a first transmission by a first sidelink UE, sense a second transmission by a second sidelink UE, and send a conflict indication to at least one of the first sidelink UE or the second sidelink UE. According to the example, the conflict indication can be sent in response to identifying a collision between the first transmission and the second transmission, or a prospective collision based on a prospective use of a first resource identified in the first transmission and a second resource identified in the second transmission.

According to another example, a method at a user equipment (UE) configured as an assisting sidelink UE for inter-UE coordination of sidelink communications in a wireless communication network is disclosed. The method can include sensing a first transmission by a first sidelink UE, sensing a second transmission by a second sidelink UE, and sending a conflict indication to at least one of the first sidelink UE or the second sidelink UE. In the example, the conflict indication can be sent in response to identifying a collision between the first transmission and the second transmission, or a prospective collision based on a prospective use of a first resource identified in the first transmission and a second resource identified in the second transmission.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 4A and 4B are diagrams illustrating examples of sidelink slot structures according to some aspects of the disclosure.

DETAILED DESCRIPTION

Figure 1:
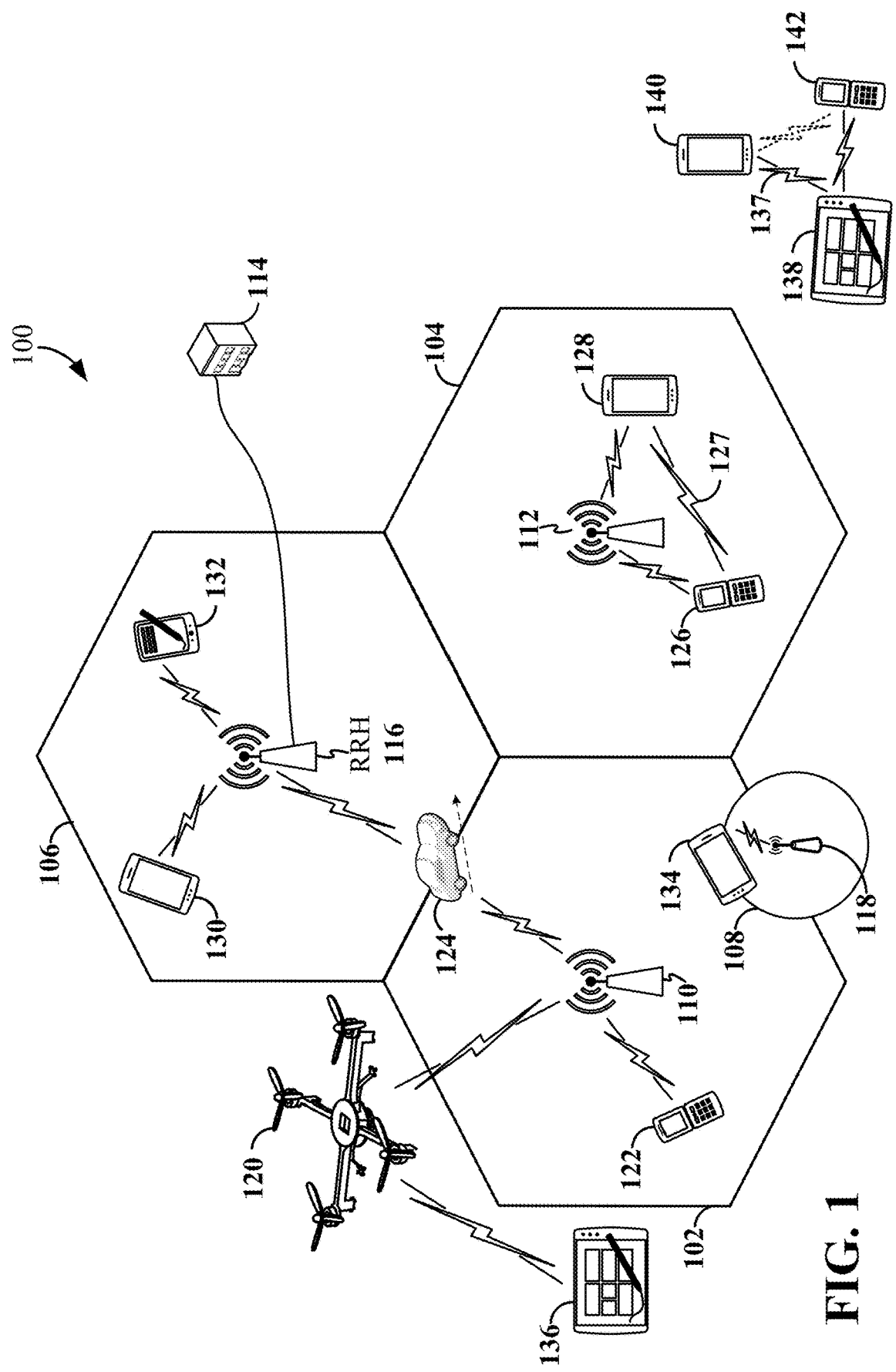
FIG. 1 is a schematic illustration of a radio access network (RAN) according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

According to aspects described herein, a sidelink UE in a plurality of sidelink UEs may assist other sidelink UEs in the plurality sidelink UEs. A sidelink UE providing the assistance may be referred to herein as an assisting sidelink UE. Assistance may be given by determining that a conflict between a first sidelink UE and a second sidelink UE (in the plurality of sidelink UEs) will occur or has occurred. The assistance may further include sending an inter-UE coordination conflict indication (referred to hereinafter as the conflict indication) to the first sidelink UE, the second sidelink UE, or both the first sidelink UE and the second sidelink UE. The conflict indication may prompt a sidelink UE receiving the conflict indication to take action to avoid the conflict if the conflict has not already occurred or to take remedial action if the conflict has already occurred.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure. In FIG. 1, one or more of the UEs may be sidelink UEs.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs (including sidelink UEs) in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), a network access point, or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118, and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between the RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signaling 137 without relaying that communication through a base station. In some examples, the UEs 138, 140, and 142 may each function as a scheduling entity or transmitting sidelink wireless communications device and/or a scheduled entity or a receiving sidelink wireless communications device to schedule resources and communicate sidelink signaling 137 therebetween without relying on scheduling or control information from a base station. In other examples, two or more UEs (e.g., UEs 126 and 128) within the coverage area of a base station (e.g., base station 112) may also communicate sidelink signaling 127 over a direct link (sidelink) without conveying that communication through the base station 112. In this example, the base station 112 may allocate resources to the UEs 126 and 128 for the sidelink communication. In either case, such sidelink signaling 127, 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelink signaling 127, 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier TDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (I-DMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
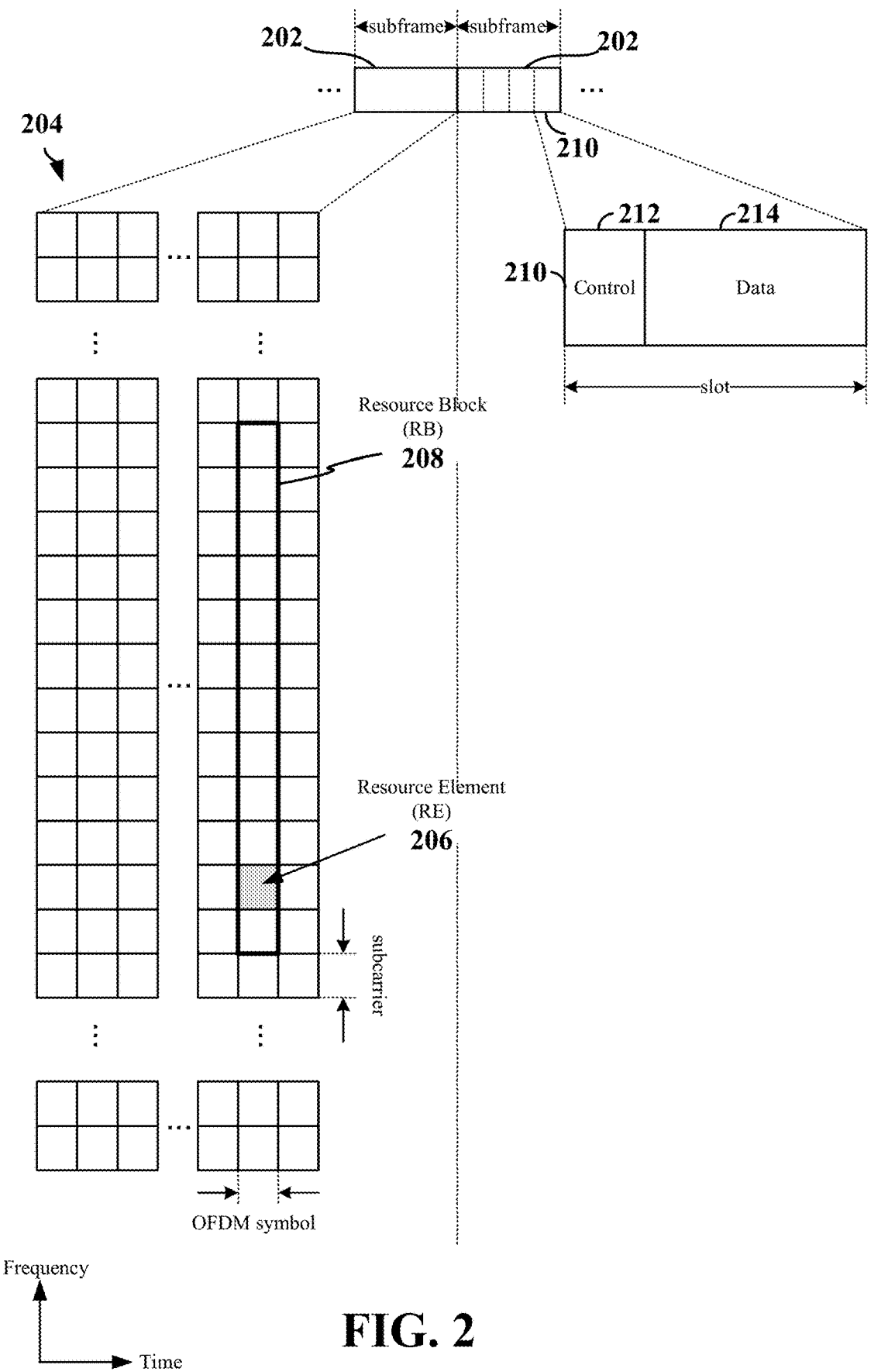
FIG. 2 is a schematic illustration of wireless resources in an air interface utilizing orthogonal frequency divisional multiplexing (OFDM) according to some aspects of the disclosure.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink wireless communications devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink wireless communications device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a System Information Type 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink wireless communications device (e.g., Tx V2X device or other Tx UE) towards a set of one or more other receiving sidelink wireless communications devices (e.g., Rx V2X device or other Rx UE). The data region 214 of the slot 210 may include a physical sidelink shared channel (PSSCH) including sidelink data traffic transmitted by the initiating (transmitting) sidelink wireless communications device within resources reserved over the sidelink carrier by the transmitting sidelink wireless communications device via the SCI. Other information may further be transmitted over various REs 206 within slot 210. For example, HARQ feedback information may be transmitted in a physical sidelink feedback channel (PSFCH) within the slot 210 from the receiving sidelink wireless communications device to the transmitting sidelink wireless communications device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 3:
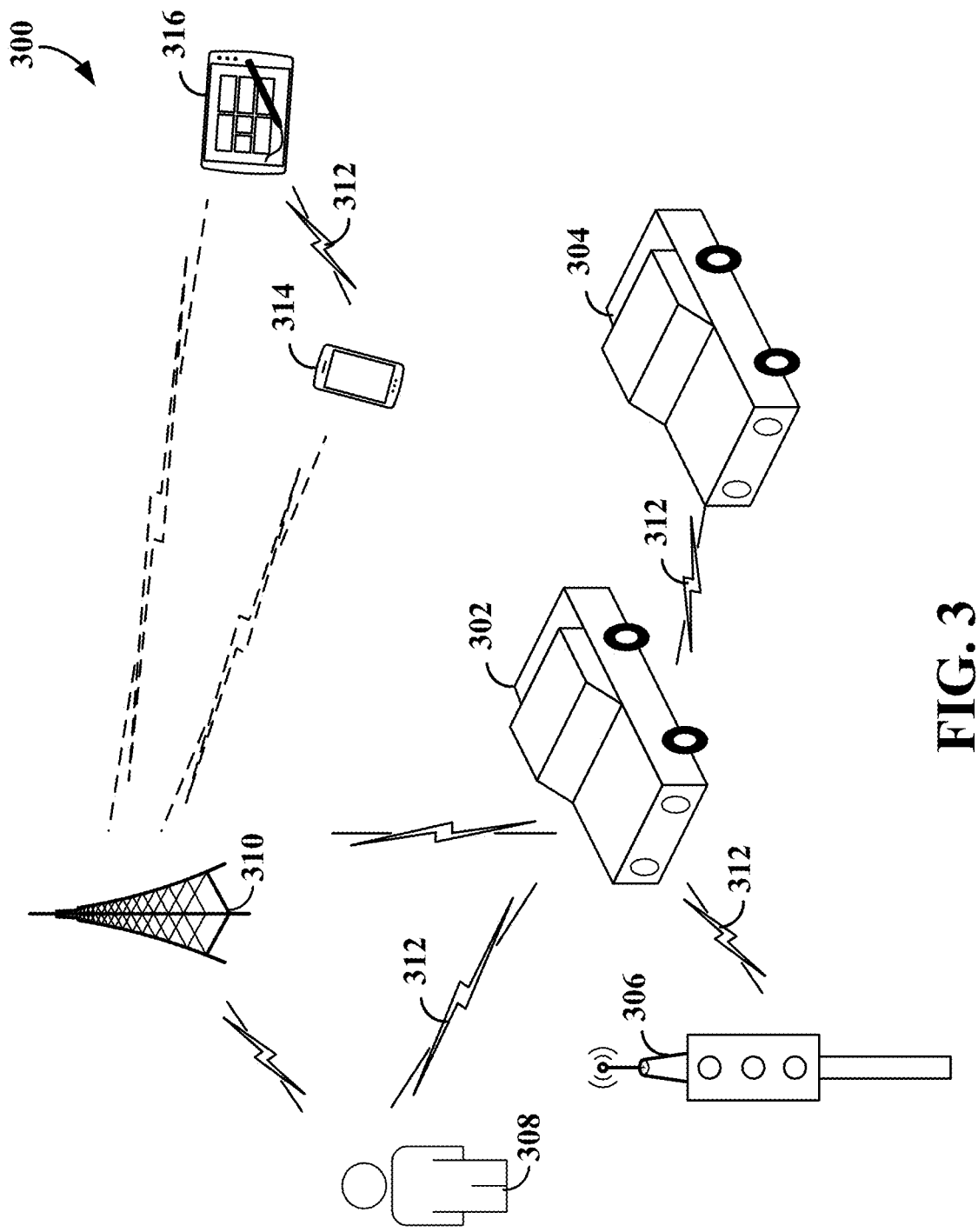
FIG. 3 is a schematic illustration of an example of a wireless communication network configured to support device-to-device (D2D) or sidelink communication according to some aspects of the disclosure.

FIG. 3 is a schematic illustration of an example of a wireless communication network 300 configured to support device-to-device (D2D) or sidelink communication according to some aspects of the disclosure. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316. Any of the UEs of FIG. 3 may be understood as being sidelink UEs.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In 5G NR, there may be four resource allocation modes of operation for sidelink (e.g., PC5) communications. In a first mode, Mode 1, a network access node (e.g., gNB) may allocate resources to wireless communication devices for sidelink communications between the wireless communication devices. In a second mode, Mode 2, the wireless communication devices may autonomously select sidelink resources for its own use. Signaling on the sidelink is the same between the two modes. Mode 3 and Mode 4 are generally directed to V2X, with Mode 4 being directed to self-scheduling of resources. Although Modes 3 and 4 are directed to V2X, the disclosures made herein may have applicability to at least Mode 2 and Mode 4. From a receiver's point of view, there is no difference between the four modes.

In a first mode, Mode 1, a base station (e.g., gNB) 310 may allocate resources to sidelink wireless communications devices (e.g., V2X devices or other sidelink wireless communications devices) for sidelink communication between the sidelink wireless communications devices in various manners. For example, the base station 310 may allocate sidelink resources dynamically (e.g., a dynamic grant) to sidelink wireless communications devices, in response to requests for sidelink resources from the sidelink wireless communications devices. For example, the base station 310 may schedule the sidelink communication via DCI 3_0. In some examples, the base station 310 may schedule the PSCCH/PSSCH within uplink resources indicated in DCI 3_0. By way of another example, the base station 310 may allocate sidelink resources by using (e.g., activating) pre-configured sidelink grants (e.g., configured grants) for sidelink communication among the sidelink wireless communications devices. In some examples, the base station 310 may activate a configured grant (CG) via RRC signaling. In Mode 1, sidelink feedback may be reported back to the base station 310 by a transmitting sidelink wireless communications device.

In a second mode, Mode 2, the sidelink wireless communications devices may autonomously select sidelink resources for sidelink communication therebetween. In some examples, a transmitting sidelink wireless communications device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2 message, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH and parameters related to identifiers (IDs). According to some aspects, SCI-2 includes a 16-bit Layer-1 (L1) destination ID, an 8-bit Layer-1 source ID, a hybrid automatic repeat request (HARQ) process ID, a new data indicator (NDI), and a redundancy version (RV). The Layer-1 source ID may be mapped from a Layer-2 source ID of a transmitting UE. The Layer-1 destination ID may be mapped from the Layer-2 destination ID. The Layer-2 destination ID may be mapped, for example, from a V2X service type, a group ID, or a Layer-2 source ID of a peer UE. For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 4A and 4B are diagrams illustrating examples of sidelink slot structures according to some aspects of the disclosure. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400*a* or 400*b* including fourteen symbols 402 that may be used for sidelink communication. However, it should be understood that sidelink communication can be configured to occupy fewer than fourteen symbols in a slot 400*a* or 400*b*, and the disclosure is not limited to any particular number of symbols 402. Each sidelink slot 400*a* and 400*b* includes a physical sidelink control channel (PSCCH) 406 occupying a control region 418 of the slot 400*a* and 400*b* and a physical sidelink shared channel (PSSCH) 408 occupying a data region 420 of the slot 400*a* and 400*b*. The PSCCH 406 and PSSCH 408 are each transmitted on one or more symbols 402 of the slot 400*a*. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400*a* and 400*b*. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400*a* or 400*b* and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408*a* that is TDMed with the PSCCH 406 and a second portion 408*b* that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400*a* shown in FIG. 4A illustrates a two symbol DMRS pattern, while slot 400*b* shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five. The PSSCH 408 may carry SCI-2 and data (e.g., a transport block (TB)).

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the second portion 408b of the PSSCH 408 may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
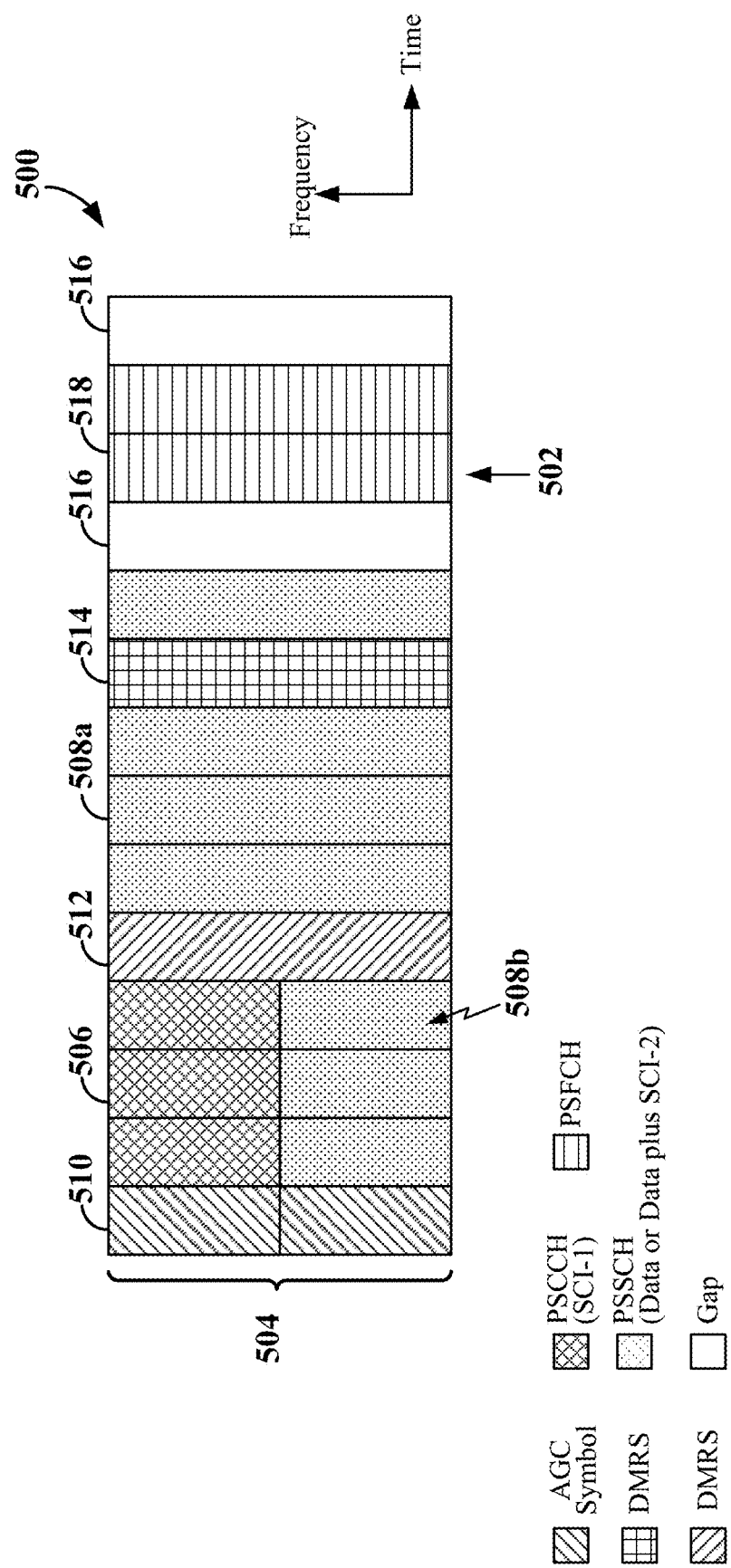
FIG. 5 is a diagram illustrating an example of a sidelink slot structure with feedback resources according to some aspects of the disclosure.

FIG. 5 is a diagram illustrating an example of a sidelink slot structure with feedback resources according to some aspects of the disclosure. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 506 may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500c. A gap symbol 516 may further be placed after the PSFCH 518 symbols.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

The channels or carriers illustrated in FIGS. 1-5 are not necessarily all of the channels or carriers that may be utilized between devices, and those of ordinary skill in the art will recognize that other channels or carriers may be utilized in addition to those illustrated, such as other traffic, control, and feedback channels.

As mentioned, in Mode 2 (and/or Mode 4), two or more UEs may operate autonomously and schedule communications between themselves without base station (e.g., network access node, eNB, gNB) coordination. Mode 2 (and/or Mode 4) is an example of, and may be referred to herein as, a self-scheduling mode. Some aspects of inter-UE coordination may be practiced by two or more UEs operating in a self-scheduling mode.

In half-duplex communication, the frequencies utilized for transmission and reception are the same. Therefore, a given sidelink UE may be constrained from transmitting and receiving at the same time. This constraint is referred to herein as a half-duplex (HD) constraint. Because of the HD constraint, a first sidelink UE may transmit at a first time and receive at a second time.

Various aspects may relate to communications between a first sidelink UE and a second sidelink UE, each of which may be operating in a half-duplex mode and may therefore each be subject to the half-duplex constraint. According to some aspects, the first sidelink UE and the second sidelink UE may be utilizing a self-scheduling mode (e.g., Mode 2 and/or Mode 4) of sidelink communication. The communications may occur in the same slot or may be planned to occur in the same slot. The resources utilized for the communications may be identified, for example, as reserved resources and/or preferred resources. Reserved resources may be associated with respective PSSCH resource assignments identified in respective SCI-1s transmitted by the first sidelink UE and the second sidelink UE. Preferred resources may be associated with respective resources identified in respective SCI-2s transmitted by the first sidelink UE and the second sidelink UE. The first sidelink UE and the second sidelink UE may be, for example, communicating with each other (e.g., unicast communication) or with a group including each other (e.g., groupcast communication).

According to some aspects of inter-UE coordination, the first sidelink UE may generate and transmit inter-UE coordination information to a second sidelink UE. The inter-UE coordination information may include the first sidelink UE's indication of a preferred resource (e.g., time-frequency resource, such as one or more sub-channels in one or more slots) for the second sidelink UE's future transmission (to the first sidelink UE) and/or the first sidelink UE's indication of a non-preferred resource for the second sidelink UE's future transmission. The second sidelink UE may accept or not accept the indication to use the preferred resource. If the second sidelink UE accepts the indication to use the preferred resource, the second sidelink UE may allocate the preferred resource to itself and/or may reserve the allocation of the preferred resource for itself. Similarly, the indication of a non-preferred resource may not be a prohibition of use of the non-preferred resource. The second sidelink UE may accept or not accept the indication of the non-preferred resource. If the second sidelink UE accepts the indication of the non-preferred resource, then the second sidelink UE may avoid allocating the non-preferred resource to itself and/or may avoid reserving the allocation of the non-preferred resource for itself. For ease of explanation, it will be understood that a reference herein to a "resource" in the singular encompasses "resources" in the plural and a reference herein to "resources" in the plural encompass a "resource" in the singular. The indication of the preferred resource may not be a reservation of the preferred resource.

There may be numerous reasons for the first sidelink UE to indicate reserved resources, preferred resources, and/or non-preferred resources to the second sidelink UE. For example, the reserved resources may be scheduled by the first sidelink UE for the use of the first sidelink UE. The preferred resources may be indicated based on the first sidelink UE's knowledge of a planned communication with a third sidelink UE in a time preceding the time occupied by the preferred resources. The non-preferred resources may be indicated based on the first sidelink UE's knowledge that the non-preferred resources are already self-allocated to the first sidelink UE for communication with another sidelink UE (not the second sidelink UE). The inter-UE coordination information may include other information (e.g., information in addition to preferred and/or non-preferred resources) that may be used to coordinate communications between the first sidelink UE and the second sidelink UE. The inter-UE coordination information may help the second sidelink UE perform its own resource allocations by, for example, adopting the suggestion to schedule a communication using the preferred resources. The inter-UE coordination information may help the second sidelink UE avoid a resource conflict or collision by, for example, adopting the suggestion to not schedule a communication using the non-preferred resource. The preceding examples are for illustration and are not intended to limit the scope of the application.

Because there is no base station scheduling the resources used by the first sidelink UE (or any sidelink UEs) operating in the self-scheduling mode in half-duplex, there is a possibility that a transmission by the first sidelink UE will conflict with or collide with a transmission by a second sidelink UE. In this case, if the two sidelink UEs operate in half-duplex mode and transmit in the same slot, neither will hear each other and neither will know of the conflict or collision between their transmissions. Furthermore, if their transmissions carried indications of respective future (e.g., prospective) reserved resources and/or preferred resources, and those respective future reserved resources and/or preferred resources will conflict or collide with each other, then again because the two UEs would not be able to hear each other, neither will know of the respective future conflict or collision between their indicated or planned uses of reserved resources and/or preferred resources. The respective transmitting sidelink UEs may therefore be unaware of actual and/or prospective conflicts or collisions.

As used herein, the word "conflict" may be used to mean a violation of the half-duplex constraint, where two or more sidelink UEs transmit in a half-duplex mode and use or plan to use indicated reserved resources and/or indicated preferred resources in one slot (e.g., a same slot) irrespective of whether the resources completely overlap, partially overlap, or do not overlap. As used herein, the word "collision" may be used to mean a use or planned use of indicated reserved resources and/or indicated preferred resources that completely or partially overlap in a given slot. A first sidelink UE may transmit respective indications of first reserved resources (e.g., identified in a first SCI-1) and/or first preferred resources (e.g., identified in a first SCI-2); a second sidelink UE may transmit respective indications of second reserved resources (e.g., identified in a second SCI-1) and/or second preferred resources (e.g., identified in a second SCI-2). As a first example, the indicated first reserved resources and second reserved resources (and/or first preferred resources and second preferred resources) may be in conflict when the respective resources occupy the same slot (irrespective of whether the resources completely overlap, partially overlap, or do not overlap in the same slot). As a second example, the indicated first reserved resources and second indicated reserved resources (and/or first preferred resources and second preferred resources) may be in a collision when the respective resources occupy the same slot and completely overlap or partially overlap. Generally, conflicts may be encompassed within collisions; however, the words conflict and collision may be used interchangeably herein.

Therefore, according to another exemplary aspect of inter-UE coordination, a third sidelink UE, referred to herein as an assisting sidelink UE (e.g., a helping UE, a monitoring UE, a listening UE) may be introduced. The assisting sidelink UE may monitor reservations of reserved resources and/or inter-UE coordination information including indications of preferred resources and/or non-preferred resources, sent from a first sidelink UE and/or a second sidelink UE.

The assisting sidelink UE may send a conflict indication to the first sidelink UE and/or the second sidelink UE if the assisting sidelink UE determines that use of the respective reserved resources and/or the respective preferred resources may result in a conflict (e.g., a resource conflict, a resource collision, due at least in part to a violation of the half-duplex constraint). The conflict indication may be, for example an indication that a conflict will occur (e.g., a pre-conflict indication) or that a conflict has occurred (e.g., a post-conflict indication). For purposes of economy, the terms conflict and collision may be used interchangeably.

Various types of inter-UE coordination information may be transmitted using different mechanisms depending, for example, on payload size. For instance, notifications of pre-conflict or post-conflict indications and an indication that a given UE is operating in a half-duplex mode may be conveyed on a PSFCH. Sensing information, including post-conflict notifications, preferred resources (e.g., candidate resources), and/or non-preferred resources, may be conveyed on a PSSCH (for example, in an SCI-2 message). Alternatively, sensing information, including post-conflict notifications, preferred resources, and/or non-preferred resources, may be conveyed using one or more MAC-CEs. In another example, a new PHY channel (e.g., different from the PSCCH, PSSCH, PSBCH, and PSFCH) may be created and utilized for inter-UE coordination messaging. In still another example, inter-UE coordination information, including pre-conflict and post-conflict indications, may be indicated in RRC messaging. Any combination of the above-listed examples and other ways to transmit inter-UE coordination information from one UE to another UE are within the scope of the disclosure.

Generally, with regard to a pre-conflict indication, two or more UEs may transmit reserved resource information (e.g., in SCI-1s) and/or inter-UE coordination information including indications of a preferred resource (e.g., in SCI-2s) for a future transmission. The reserved resource and/or preferred resource may occur in a same slot (e.g., the same, different contiguous but partially overlapping, or non-overlapping resources in the same slot). A third UE (referred to herein as the assisting sidelink UE) may decode the reserved resource and/or the preferred resource information and may detect (e.g., identify) a probable (e.g., likely, expected, feasible) conflict. The detection (e.g., identification) of the probable conflict may be based, for example, on a mathematical comparison of the indicated reserved resources and/or preferred resources (e.g., mathematically determining that the resources are in the same slot and have the same, overlapped, or non-overlapped resources in the same slot). The detection of the probable conflict may additionally be based, for example, on knowledge that the two or more sidelink UEs are operating in a TDD mode (e.g., a half-duplex mode). The assisting sidelink UE may send a pre-conflict indication to one or more of the two or more sidelink UEs to indicate the probable conflict. According to some aspects, the one or more sidelink UEs that receive the pre-conflict indication may act to prevent the conflict. For example, the one or more sidelink UEs may cancel the indications of reserved resources and/or preferred resources or change the indications of the reserved resources and/or the preferred resources and send an updated resource reservation information and/or an updated inter-UE coordination information message.

Generally, with regard to a post-conflict indication, the assisting sidelink UE may detect (e.g., identify through sensing, through measurement of physical channels) a conflict or collision between transmissions from the two or more sidelink UEs. The assisting sidelink UE may send a post-conflict indication to one or more of the two or more sidelink UEs to indicate the detection of the conflict or collision. According to some aspects, the one or more sidelink UEs that receive the post-conflict indication may act accordingly in response to receipt of the post-conflict indication. For example, the one or more sidelink UEs may retransmit respective packets that conflicted or collided and may request that other sidelink UEs retransmit packets not received.

According to some aspects described herein, a self-scheduling mode (e.g., Mode 2 and/or Mode 4) sidelink transmission may include a transmission on the PSCCH. The transmission on the PSCCH may carry SCI-1 (i.e., first stage sidelink control information). The SCI-1 may identify reserved resources including those reserved for an SCI-2. The sidelink transmission may further include transmission on the PSSCH. The transmission on the PSSCH may carry the SCI-2 (i.e., the second stage sidelink control information) referenced by the SCI-1. The transmission on the PSSCH may also carry data (e.g., a transport block) and may identify preferred resources.

Several examples describing various ways to support inter-UE coordination in self-scheduling mode sidelink communications given the half-duplex constraint are provided below. For ease and simplicity of discussion, each example employs three sidelink UEs and one slot. In some examples, a first sidelink UE and a second sidelink UE may themselves intend to transmit in the slot (e.g., by reserving resources in the slot) or may suggest (by respective transmissions of inter-UE coordination information including respective indications of preferred resources in the slot) that intended recipients of respective inter-UE coordination information sent from the first sidelink UE and/or the second sidelink UE may transmit in the slot. In some examples, the first sidelink UE and the second sidelink UE, or recipients of respective inter-UE coordination information sent from the first sidelink UE and the second sidelink UE may have already transmitted in the slot. An assisting sidelink UE may assist the first sidelink UE and the second sidelink UE by, for example, decoding their respective reserved resource information and/or inter-UE coordination information messages and/or sensing their transmissions and/or the transmissions of the recipients of the reserved resource information and/or inter-UE coordination information messages. The assisting sidelink UE may transmit pre-conflict indications and/or post-conflict indications (as called for within the parameters of a given example).

Those of ordinary skill in the art will understand that the examples described herein are applicable to more than three sidelink UEs. For instance, the first sidelink UE may groupcast to a given group of receiving sidelink UEs. In another instance, the first sidelink UE may unicast to a third sidelink UE (in a plurality of sidelink UEs) and the second sidelink UE may unicast to a fourth sidelink UE (which may or may not be included in the plurality of sidelink UEs). The assisting sidelink UE may transmit indication(s) to none or to one or more of the first sidelink UE and the plurality of sidelink UEs, all according to aspects described herein.

Those of ordinary skill in the art will understand that the examples described herein are applicable to one or more than one slot. For example, a reserved resource and/or a preferred resource may be expressed in terms of one slot or a plurality of slots. A conflict may occur if competing transmissions occur in the same slot or on overlapping pluralities of slots with at least one slot in common with each of the plurality of slots.

The examples may illustrate how the assisting sidelink UE may detect (e.g., determine, identify) that a conflict between at least the first sidelink UE and the second sidelink UE has occurred or will occur. Note that as used herein, the words detect or detection may be synonymous with the words identify and identification, respectively. Detection or identification does not necessarily mean that the thing detected or identified is presently occurring or has occurred in the past. Detection or identification may mean that the thing detected or identified may be probable to occur in the future. The examples may further illustrate how the assisting sidelink UE may detect or evaluate if at least one inter-UE coordination criterion is satisfied. The inter-UE coordination criteria may be related to aspects or combinations of aspects related to the first sidelink UE, the second sidelink UE, and/or the assisting sidelink UE. Satisfaction of at least one inter-UE coordination criterion may determine whether the assisting sidelink UE does or does not send one or more sidelink UEs a pre-conflict indication or a post-conflict indication. The examples may still further illustrate to which sidelink UEs the assisting sidelink UE sends, responsive to determining that at least one inter-UE coordination criterion is satisfied, a conflict indication (e.g., a pre-conflict indication, a post-conflict indication, or both).

Figure 6:
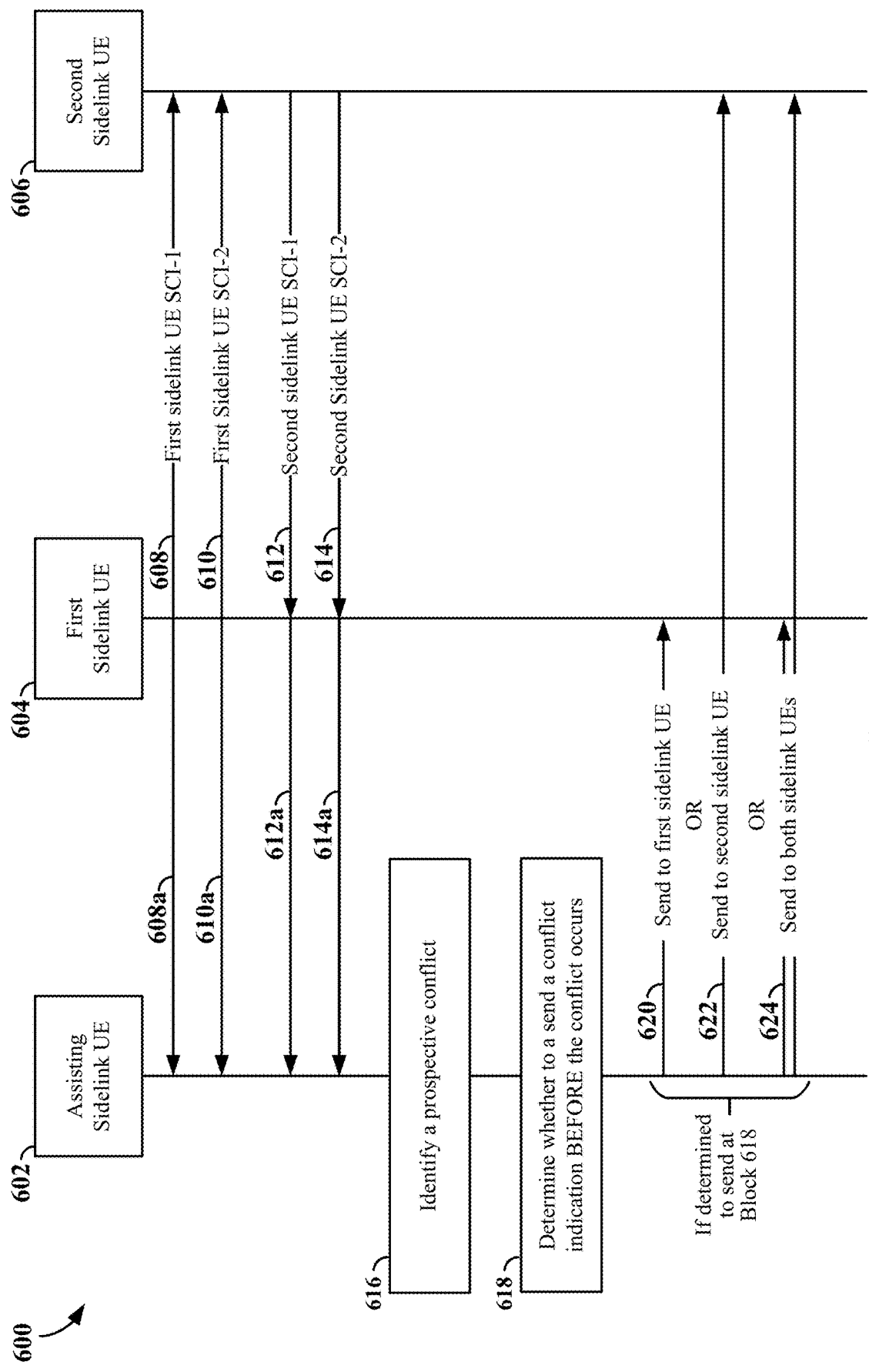
FIG. 6 is a call flow diagram illustrating messaging exchanged between an assisting sidelink UE, a first sidelink UE, and a second sidelink UE according to some aspects of the disclosure.

FIG. 6 is a call flow diagram 600 illustrating messaging exchanged between an assisting sidelink UE 602, a first sidelink UE 604, and a second sidelink UE 606 according to some aspects of the disclosure. FIG. 6 may provide an example in which the assisting sidelink UE 602 sends a pre-conflict indication message to at least one of: the first sidelink UE 604, or the second sidelink UE 606. A pre-conflict indication message may be sent, for example, after the assisting sidelink UE 602 receives respective first and second transmissions from the first sidelink UE 604 and the second sidelink UE 606 and the respective transmissions identify respective reserved resources, for example, reserved resources that may be associated with respective PSSCH resource assignments and resource reservation periods identified in respective SCI-1s included in the respective first and second transmissions. The pre-conflict indication message(s) may be sent if, for example, the assisting sidelink UE 602 might identify a prospective collision based on a prospective use of the respective reserved resources. In another example, a pre-conflict indication message may be sent, for example, after the assisting sidelink UE 602 receives respective first and second transmissions from the first sidelink UE 604 and the second sidelink UE 606 and the respective transmissions identify respective preferred resources, for example, preferred resources that may be indicated in inter-UE coordination information (or messages) identified in respective SCI-2s included in the respective additional or alternative transmissions from the respective first and second sidelink UEs. In this additional example, the pre-conflict indication message(s) may be sent if, for example, the assisting sidelink UE 602 might identify a prospective collision based on a prospective use of the respective preferred resources.

According to the example of FIG. 6, the first sidelink UE 604 and a second sidelink UE 606 may each operate in a self-scheduling mode (e.g., Mode 2 and/or Mode 4). Additionally, the first sidelink UE 604 and the second sidelink UE 606 may communicate using half-duplex communication. The first sidelink UE 604 and the second sidelink UE 606 may intend to conduct sidelink communications between themselves. However, the example may be expanded to cover communication between the first sidelink UE 604, the second sidelink UE 606, and/or other sidelink UEs (not shown). For example, the first sidelink UE 604 may transmit a first SCI-1 and a first SCI-2 to a third sidelink UE (not shown) instead of, or in addition to the second sidelink UE 606. In another example, the first sidelink UE 604 may transmit the first SCI-1 and the second SCI-2 to a first plurality of other sidelink UEs (not shown). The first plurality of other sidelink UEs (not shown) may be members of a first group that includes the first sidelink UE 604. The first sidelink UE 604 may groupcast the first SCI-1 and the first SCI-2 to the first plurality of other sidelink UEs (not shown) of the first group. The second sidelink UE 606 may or may not be a member of the first group. By way of an additional example, the second sidelink UE 606 may transmit a second SCI-1 and a second SCI-2 to a fourth sidelink UE (not shown). In still another example, the second sidelink UE 606 may transmit the second SCI-1 and the second SCI-2 to a second plurality of other sidelink UEs (not shown). The second plurality of other sidelink UEs (not shown) may be members of a second group that includes the second sidelink UE 606. The second sidelink UE 606 may groupcast its second SCI-1 and the second SCI-2 to the second plurality of other sidelink UEs (not shown) of the second group. The first sidelink UE 604 may or may not be a member of the second group. These and other examples of exchanges of messages are within the scope of the disclosure.

For ease of discussion, in the example of FIG. 6, respective reserved resources that may be identified in respective SCI-1s received by the assisting sidelink UE 602 from the first sidelink UE 604 and the second sidelink UE 606 may each identify a same slot or respective sets of slots with at least one common slot between them. Additionally, or alternatively, respective preferred resources that may be identified in respective SCI-2s received by the assisting sidelink UE 602 from the first sidelink UE 604 and the second sidelink UE 606 may each identify the same slot or the respective sets of slots with at least one common slot between them.

According to the example of FIG. 6, at 608, the first sidelink UE 604 may transmit, and the second sidelink UE 606 may receive, a first SCI-1 on a PSCCH. The SCI-1 may include, for example, an identification of a first reserved resource. At 610 the first sidelink UE 604 may transmit, and the second sidelink UE 606 may receive, a first SCI-2 on a PSSCH. The SCI-2 may include, for example, inter-UE coordination information that may identify a first preferred resource. The PSCCH and the PSSCH may be present in the same slot or slots. At 608a, the assisting sidelink UE 602 may receive the first SCI-1 and at 610a the assisting sidelink UE 602 may receive the first SCI-2. For practical reasons (e.g., the speed of light and the distance between the sidelink UEs) the second sidelink UE 606 and the assisting sidelink UE 602 may receive, at 608, 608a, the first SCI-1 at substantially the same time and may receive, at 610, 610a, the first SCI-2 at substantially the same time. The second sidelink UE 606 and the assisting sidelink UE 602 may each utilize the information received, at 608, 608a, in the first SCI-1 to identify the first reserved resource (if present) and to locate the corresponding first SCI-2 of the first sidelink UE 604.

The first reserved resource and the first preferred resource (and/or the first non-preferred resource) may be expressed (e.g., identified), for example, in terms of frequency and time (e.g., a start frequency, a start time, a frequency range, and a stop time) or slot number(s)/range(s) and subchannel number(s)/range(s). Other ways of expressing (e.g., identifying) the first reserved resource and/or the first preferred resource (and/or the first non-preferred resource) are within the scope of the disclosure.

As described herein, the first reserved resource may be reserved by the first sidelink UE 604 for transmission of the PSSCH, for example. As described herein, the first preferred resource may be a resource that the first sidelink UE 604 prefers (e.g., proposes, suggests, recommends) for the second sidelink UE 606 to utilize when transmitting data and/or control to the first sidelink UE 604. According to some aspects, the second sidelink UE 606 may adopt the first preferred resource and schedule or reserve the first preferred resource for transmitting the data and/or control of the second sidelink UE 606 to the first sidelink UE 604.

Similarly, and also according to the example of FIG. 6, at 612, the second sidelink UE 606 may transmit, and the first sidelink UE 604 may receive, a second SCI-1 on a PSCCH. The second SCI-1 may include an indication of a second reserved resource. The second reserved resource is similar to the first reserved resource (except that the second reserved resource may be reserved by the second sidelink UE 606 and the first reserved resource may be reserved by the first sidelink UE 604). Accordingly, further description of the second reserved resource is omitted. At 614 the second sidelink UE 606 may transmit, and the first sidelink UE 604 may receive, a second SCI-2 on a PSSCH. The second SCI-2 may indicate a second preferred resource (associated with second inter-UE coordination information). The second preferred resource is similar to the first preferred resource (except that the second preferred resource may be proposed by the second sidelink UE 606 (not reserved) as a resource that the first sidelink UE 604 may use when the first sidelink UE 604 returns a transmission to the second sidelink UE 606). Accordingly, further description of the second preferred resource is omitted.

At 612a, the assisting sidelink UE 602 may receive the second SCI-1, and at 614a, the assisting sidelink UE 602 may receive the second SCI-2. The contents and uses of the second SCI-1 and the second SCI-2 are similar to the contents and uses of the first SCI-1 and the first SCI-2. Detailed descriptions of the second SCI-1 and the second SCI-2 are therefore omitted to avoid redundancy.

The transmissions, at 608 and 610, from the first sidelink UE 604 of the first SCI-1 and first SCI-2, respectively, are depicted as preceding the transmissions, at 612 and 614, from the second sidelink UE of the second SCI-1 and the second SCI-2; however, the depiction is exemplary and non-limiting. Transmissions of SCI-1/SCI-2 pairs between different sidelink UEs in any order are within the scope of the disclosure.

At 616, the assisting sidelink UE 602 may identify a prospective conflict (e.g., identify a future collision between reserved resources and/or preferred resources in a same slot, or identify a future conflict between reserved resources and/or preferred resources in the same slot, irrespective of whether the respective resources completely overlapped, partially overlapped, or did not overlap in that same slot). The identification of the prospective conflict may be based, for example, on a prospective use of a first resource identified in a first transmission and a second resource identified in a second transmission. In one example, the first resource identified in the first transmission may be the first reserved resource identified in the first SCI-1 and the second resource identified in the second transmission may be the second reserved resource identified in the second SCI-1. In another example, the first resource identified in the first transmission may be the first preferred resource identified in the first SCI-2 and the second resource identified in the second transmission may be the second preferred resource identified in the second SCI-2. Other examples of first and second resources are within the scope of the disclosure.

At 618, if the assisting sidelink UE 602 identified, at 616, that a prospective conflict or collision may occur (e.g., may be probable but has not yet occurred), then the assisting sidelink UE 602 may determine whether to send a conflict indication (e.g., a pre-conflict indication) before the prospective conflict occurs. The determination may be based, for example, on determining if at least one inter-UE coordination criterion is satisfied. Examples of inter-UE coordination criteria are provided in examples herein.

If it is determined (at block 616) that a prospective conflict or collision may occur, and if it is determined (at block 618) that the assisting sidelink UE 602 may send a conflict indication (e.g., a pre-conflict indication) before the prospective conflict occurs, then the assisting sidelink UE 602 may determine to send at, at 620, the pre-conflict indication to at least one of: the first sidelink UE 604, or the second sidelink UE 606. Aspects that may be used by the assisting sidelink UE 602 to determine whether to send the pre-conflict indication to one or both of the first sidelink UE 604 and the second sidelink UE 606 are provided in examples herein.

Figure 7:
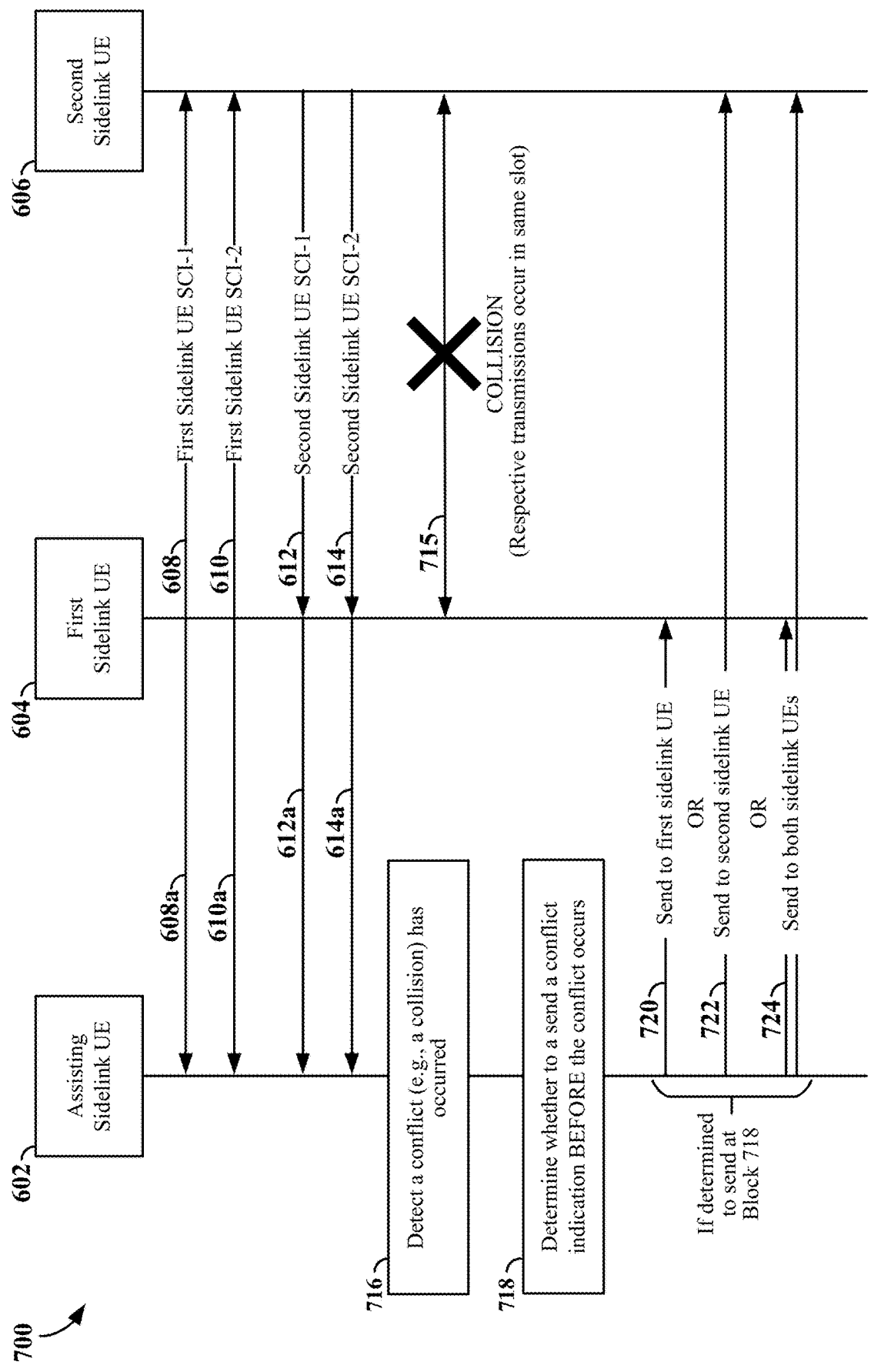
FIG. 7 is a call flow diagram illustrating messaging exchanged between an assisting sidelink UE, a first sidelink UE, and a second sidelink UE according to some aspects of the disclosure.

FIG. 7 is a call flow diagram 700 illustrating messaging exchanged between the assisting sidelink UE 602, the first sidelink UE 604, and the second sidelink UE 606 according to some aspects of the disclosure. FIG. 7 may provide an example in which the assisting sidelink UE 602 sends a post-conflict indication message to at least one of: the first sidelink UE 604 or the second sidelink UE 606. A post-conflict indication message may be sent, for example, after the assisting sidelink UE 602 senses a first transmission by a first sidelink UE, senses a second transmission by a second sidelink, and identifies a conflict or collision between the first transmission and the second transmission.

Blocks 608, 608a, 610, 610a, 612, 612a, 614, and 614a correspond to blocks of the same reference numbers described in connection with FIG. 6. Their descriptions are not repeated to avoid redundancy. According to some aspects, a collision may have occurred at blocks 608 and 612 and/or at blocks 610 and 614. The collisions might have been between first and second transmission resources (e.g., at blocks 608 and 612 or blocks 610 and 614). However, for purposes of the explanation of FIG. 7, it may be assumed that collisions of these first and second transmissions did not occur. Instead, according to the example of FIG. 7, respective reserved resources (identified, for example, in respective SCI-1s at 608 and 610) or respective preferred resources (identified, for example, in respective SCI-2s at 610 and 614) may have been utilized and may have caused the conflicting/colliding transmissions at 715.

At 716, the assisting sidelink UE 602 may identify the conflict or collision (e.g., the present, instant, or actual) at 715. The identification of the conflict or collision may be based, for example, on at least one of detection of a complete overlap of respective time resources and respective frequency resources used in first and second transmissions, detection of a partial overlap of the respective time resources and/or the respective frequency resources of the first and second transmissions, or detection of any portion of the first transmission and the second transmission occurring in a slot common to the first and second transmissions, while the first sidelink UE 604 and the second sidelink UE 606 both operate in a half-duplex mode.

At 718, if the assisting sidelink UE 602 identified, at 716, that a conflict or collision did occur (e.g., at 715), then the assisting sidelink UE 602 may determine whether to send a conflict indication (e.g., a post-conflict indication) after the conflict (e.g., the conflict or collision) occurs. The determination may be based, for example, on determining if at least one inter-UE coordination criterion is satisfied. Examples of inter-UE coordination criteria are provided in examples herein.

If it is determined (at block 716) that a conflict or collision occurred (at 715), and if it is determined (at block 718) that the assisting sidelink UE 602 may send a conflict indication (e.g., a post-conflict indication) after the collision occurred, then the assisting sidelink UE 602 may determine to send at, at 720, the post-conflict indication to at least one of: the first sidelink UE 604, or the second sidelink UE 606. Aspects that may be used by the assisting sidelink UE 602 to determine whether to send the post-conflict indication to one or both of the first sidelink UE 604 and the second sidelink UE 606 are provided in examples herein.

In the examples of FIG. 6 and FIG. 7, the assisting sidelink UE 602 may be configured to send pre-conflict indications, post-conflict indications, or both. The configuration of the assisting sidelink UE 602 for these purposes may be preconfigured, semi-persistently configured, or dynamically configured (e.g., dynamically based on a source or destination ID obtained in an SCI-2 message, based on membership in a group, based on zone, etc.).

By way of overview, and without any intent to limit the scope of the disclosure, the aspects described herein may be related to detection or identification of a conflict or collision (which has occurred) or a prospective conflict or collision (which may occur) between transmissions from two or more UEs (including sidelink UEs). The conflicts or collisions may be those of time resources and/or frequency resources in allocated or prospectively allocated resources. The conflict or collisions may occur within a slot or slots utilized by two or more UEs (including sidelink UEs) to transmit data and/or control to one another. By way of example and not limitation, one slot common to the transmissions of two sidelink UEs may be considered below for exemplary purposes.

According to one aspect, the one slot might have been used for transmission from at least two sidelink UEs. According to this aspect, a conflict or collision of resources may cause an assisting sidelink UE that identified the conflict or collision to send a post-conflict indication to one or more of the sidelink UEs involved in the collision. According to another aspect, the one slot may be reserved for use by at least two sidelink UEs. In this instance, a conflict or collision may be referred to as a prospective conflict or collision (because the conflict or collision may occur in the future). This exemplary prospective conflict or collision may cause the assisting sidelink UE that identified the prospective conflict or collision to send a pre-conflict indication to one or more of the sidelink UEs that may be involved in this prospective collision. According to still another aspect, a proposed resource associated with the one slot may be proposed for the use of a second sidelink UE; the proposal may come from a first sidelink UE. Additionally, the proposed resource may be proposed for the use of the first sidelink UE; the proposal may come from the second sidelink UE. In this instance, the proposed resource may be referred to as a preferred resource. The preferred resource may be identified in inter-UE coordination information. In this instance, a conflict or collision may also be referred to as a prospective conflict or collision (because the conflict or collision may occur in the future). As before, this exemplary prospective conflict or collision may cause the assisting sidelink UE that identified the prospective conflict or colli-sion to send a pre-conflict indication to one or more of the sidelink UEs that may be involved in this prospective conflict or collision.

Conflicts resulting in collisions may occur due to overlaps (e.g., complete or partial) of time and/or frequency resources within the commonly used slot. However, in the instance of two or more sidelink UEs communicating using half-duplex communication, the conflict may be caused by the common use of the slot without regard to whether a collision of time resources, frequency resources, both time and frequency resources, or neither time nor frequency resources occurs within the commonly used slot. The earlier mentioned half-duplex constraint may cause this type of conflict. Due to the half-duplex constraint, two (or more) half-duplex sidelink UEs may not simultaneously transmit and receive in any given slot. Accordingly, due to the half-duplex constraint, two (or more) half-duplex sidelink UEs simultaneously transmitting in a given slot are unable to hear each other and may be unable to determine that their transmissions are in conflict/collision, or that use of reserved or preferred resources identified in their transmissions are in prospective conflict (e.g., their use is associated with the same slot or may cause a collision within the same slot). Accordingly, at least three types of situations for resources in any commonly used slot may be considered: 1) complete overlap of time and frequency resources; 2) partial overlap of time and frequency resources; and 3) complete, partial, or no overlap of time and frequency resources in the commonly used slot when the two or more sidelink UEs transmitting in that commonly used slot are communicating in a half-duplex mode.

The following non-limiting simplified examples are offered to illustrate the at least three types of situations of resources in any commonly used slot. The resources may be presently used or prospectively used.

1. Complete overlap in time and frequency. For example:
   Resource 1=slot #1, symbols 5 and 6, subchannels 1-25.
   Resource 2=slot #1, symbols 5 and 6, subchannels 1-25.
2. Partial overlap in time and/or frequency. For example:
   A) partial overlap in time and complete overlap in frequency:
      Resource 1=Slot #1, symbols 5 and 6, subchannels 1-25,
      Resource 2=Slot #1, symbols 6 and 7, subchannels 1-25;
   B) partial overlap in time and partial overlap in frequency:
      Resource 1=Slot #1, symbols 5 and 6, subchannels 1-25,
      Resource 2=Slot #1, symbols 6 and 7, subchannels 10-40; and/or
   C) complete overlap in time and partial overlap in frequency:
      Resource 1=Slot #1, symbols 5 and 6, subchannels 1-25,
      Resource 2=Slot #1, symbols 5 and 6, subchannels 10-40.
3. Any or no overlap in time and/or frequency when sidelink UEs communicate in half-duplex (HD) (e.g., thus invoking the half-duplex constraint). For example:
   A) complete overlap in time and frequency as in 1 and communication is HD;
   B) partial overlap in time and complete overlap in frequency as in 2A and communication is HD;

C) partial overlap in time and partial overlap in frequency as in 2B and communication is HD;
D) complete overlap in time and partial overlap in frequency as in 2C and communication is HD; and/or
E) no overlap in time or frequency and communication is HD. For example:
Resource 1=Slot #1, symbols 4 and 5 subchannels 1-25,
Resource 2=Slot #1, symbols 10 and 11, subchannels 820-920.

Figure 8:
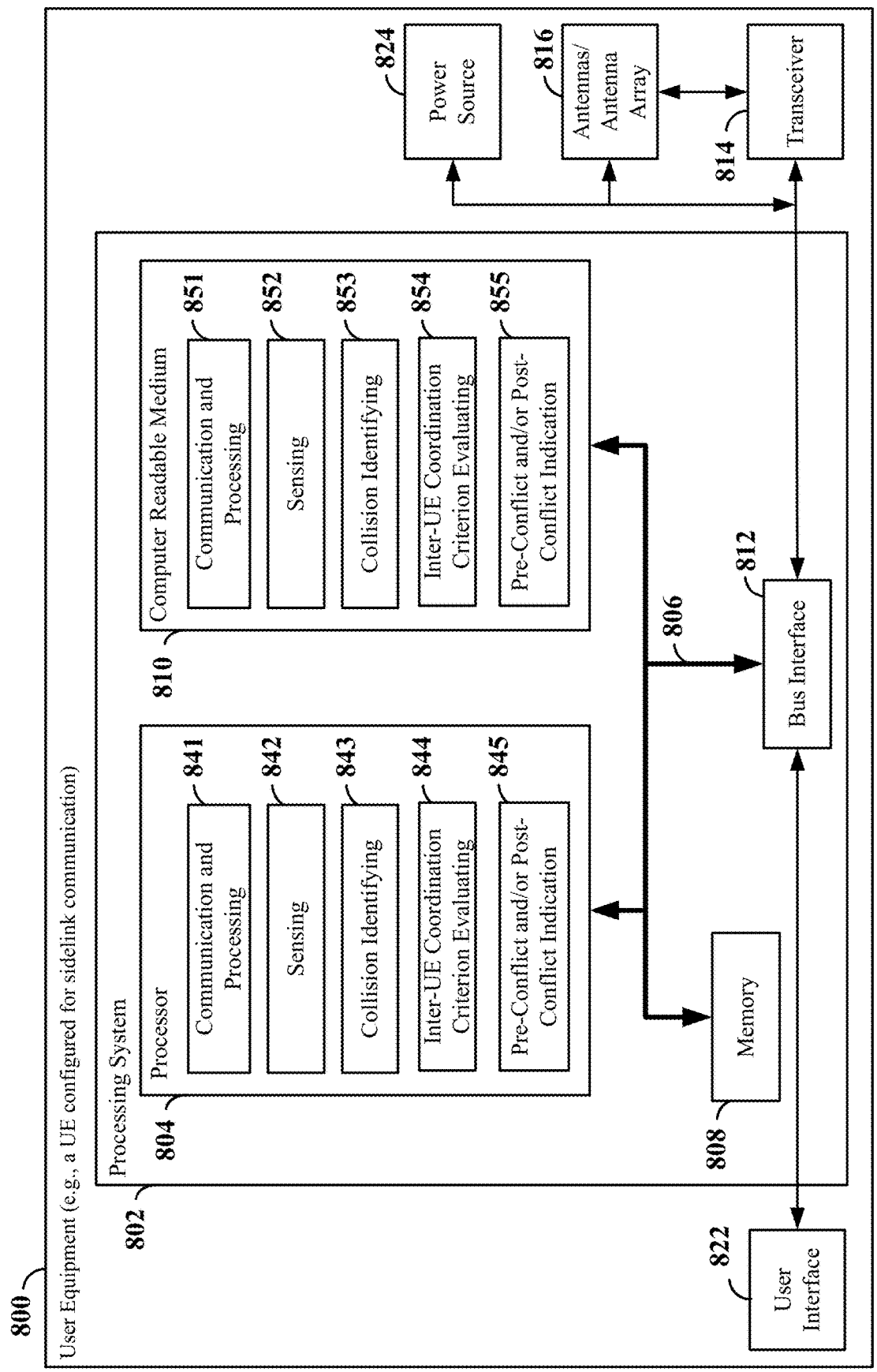
FIG. 8 is a block diagram illustrating an example of a hardware implementation of a UE that may be configured as a sidelink UE and/or an assisting sidelink UE, employing a processing system according to some aspects of the disclosure.

FIG. 8 is a block diagram illustrating an example of a hardware implementation of a UE that may be configured as a sidelink UE and/or an assisting sidelink UE, employing a processing system 802 according to some aspects of the disclosure.

According to some aspects of the disclosure, the sidelink UE may be configured as an assisting sidelink UE 800 for inter-UE coordination of sidelink communications in a wireless communication network. The assisting sidelink UE 800 may be any UE configured for sidelink communications as illustrated in any one or more of FIGS. 1, 3, 6, and 7 herein.

In accordance with various aspects of the disclosure, an element, or any portion of an element, or any combination of elements may be implemented with a processing system 802 that includes one or more processors, such as processor 804. Examples of processor 804 include microprocessors, microcontrollers, digital signal processors (DSPs), field-programmable gate arrays (FPGAs), programmable logic devices (PLDs), state machines, gated logic, discrete hardware circuits, and other suitable hardware configured to perform the various functionality described throughout this disclosure. In various examples, the assisting sidelink UE 800 may be configured to perform any one or more of the functions described herein. That is, the processor 804, as utilized in the assisting sidelink UE 800, may be used to implement any one or more of the methods or processes described herein and illustrated, for example, in FIGS. 6, 7, and 9-12.

The processor 804 may in some instances be implemented via a baseband or modem chip, and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 802 may be implemented with a bus architecture, represented generally by the bus 806. The bus 806 may include any number of interconnecting buses and bridges depending on the specific application of the processing system 802 and the overall design constraints. The bus 806 communicatively couples together various circuits, including one or more processors (represented generally by the processor 804), a memory 808, and computer-readable media (represented generally by the computer-readable medium 810). The bus 806 may also link various other circuits such as timing sources, peripherals, voltage regulators, and power management circuits, which are well known in the art, and therefore will not be described any further.

A bus interface 812 provides an interface between the bus 806 and a transceiver 814. The transceiver 814 may be, for example, a wireless transceiver. The transceiver 814 provides a means for communicating with various other apparatus over a transmission medium (e.g., air interface). The transceiver may be coupled to one or more antennas/antenna array 816. The bus interface 812 further provides an interface between the bus 806 and a user interface 822 (e.g., keypad, display, touch screen, speaker, microphone, control features, etc.). Of course, such a user interface 822 may be optional and may be omitted in some examples. In addition, the bus interface 812 further provides an interface between the bus 806 and a power source 824 and between the bus 806 and the antennas/antenna array 816 (e.g., for switching and/or self-test, for example).

One or more processors, such as processor 804, may be responsible for managing the bus 806 and general processing, including the execution of software stored on the computer-readable medium 810. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 810. The software, when executed by the processor 804, causes the processing system 802 to perform the various processes and functions described herein for any particular apparatus.

The computer-readable medium 810 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 810 may reside in the processing system 802, external to the processing system 802, or distributed across multiple entities including the processing system 802. The computer-readable medium 810 may be embodied in a computer program product or article of manufacture. By way of example, a computer program product or article of manufacture may include a computer-readable medium in packaging materials. In some examples, the computer-readable medium 810 may be part of the memory 808. Those of ordinary skill in the art will recognize how best to implement the described functionality presented throughout this disclosure depending on the particular application and the overall design constraints imposed on the overall system. The computer-readable medium 810 and/or the memory 808 may also be used for storing data that is manipulated by the processor 804 when executing software.

In some aspects of the disclosure, the processor 804 may include circuitry configured for various functions. For example, the processor 804 may include communication and processing circuitry 841 configured for various functions, including, for example, communicating with a UE, a UE configured for sidelink communication, and/or remote network such as a network core (e.g., a 5G core network), or any other entity, such as, for example, local infrastructure or an entity communicating with the assisting sidelink UE 800 via the Internet, such as a network provider. In addition, the communication and processing circuitry 841 may be configured to receive and transmit traffic and control messages, including traffic and control messages related to sidelink communications. In addition, the communication and processing circuitry may be configured to communicate with other sidelink UEs, schedule other sidelink UEs, and be scheduled by other sidelink UEs. In some examples, the communication and processing circuitry 841 may include one or more hardware components that provide the physical structure that performs processes related to wireless communication (e.g., signal reception and/or signal transmission), signal processing (e.g., processing a received signal and/or processing a signal for transmission), and receiving and transmitting sidelink traffic and control messages. The communication and processing circuitry 841 may further be configured to execute communication and processing software 851 stored on the computer-readable medium 810 to implement one or more of the functions described herein.

For example, the processor 804 may include sensing circuitry 842 configured for various functions, including, for example, sensing a first transmission by a first sidelink UE and sensing a second transmission by a second sidelink UE. As used herein, sensing may include detection of control and data and/or detection of any signals occupying a given bandwidth. In some examples, the sensing circuitry 842 may include one or more hardware components that provide the physical structure that performs processes related to sensing the first transmission by a first sidelink UE and sensing a second transmission by a second sidelink UE. The sensing circuitry 842 may further be configured to execute sensing software 852 stored on the computer-readable medium 810 to implement one or more of the functions described herein.

In some examples, the processor 804 may include collision identifying circuitry 843 configured to, for example, identify a collision between a first transmission and a second transmission and identify a prospective collision based on a prospective use of a first resource identified in the first transmission and a second resource identified in the second transmission. According to other aspects, the collision identifying circuitry 843 may also determine that (or if) a conflict between a first sidelink UE and a second sidelink UE will occur or has occurred.

According to some aspects, the collision identifying circuitry 843 may be configured to identify the collision between the first transmission and the second transmission by, for example, detecting if a complete overlap of respective time resources and respective frequency resources of a first transmission resource (identified in the first transmission) and a second transmission resource (identified in the second transmission) occurs in a slot common to the first transmission resource and the second transmission resource, by detecting if a partial overlap of the respective time resources and/or the respective frequency resources of the first transmission resource and the second transmission resource occurs in the slot common to the first transmission resource and the second transmission resource, or by detecting if any respective portion of the first transmission and the second transmission occurred in the slot common to the first transmission resource and the second transmission resource and the first sidelink UE and the second sidelink UE both operate in a half-duplex mode.

According to some aspects, the collision identifying circuitry 843 may be configured to detect if a complete overlap of respective time resources and respective frequency resources of the first resource and the second resource occurs in a slot common to the first resource and the second resource, configured to detect if a partial overlap of the respective time resources and/or the respective frequency resources of the first resource and the second resource prospectively occur in the slot common to the first resource and the second resource, or configured to detect if any respective portion of the first resource and the second resource prospectively occupies the slot common to the first resource and the second resource and the first sidelink UE and the second sidelink UE prospectively operate in a half-duplex mode.

The collision identifying circuitry 843 may alternatively determine that a conflict between the first sidelink UE and the second sidelink UE has occurred by comparing preferred resource and/or non-preferred resource information in inter-UE coordination messaging. Some or all of the processing related to collision identification and/or determining that (or if) a conflict between the first sidelink UE and the second sidelink UE will occur or has occurred may be shared with one or more of the communication and processing circuitry 841 and the transceiver 814. In some examples, the collision identifying circuitry 843 may include one or more hardware components that provide the physical structure that performs processes related to, for example, identifying a collision between the first transmission and the second transmission, or identifying a prospective collision based on a prospective use of a first resource identified in the first transmission and a second resource identified in the second transmission, or determining that (or if) a conflict between the first sidelink UE and the second sidelink UE will occur or has occurred. The collision identifying circuitry 843 may further be configured to execute collision identifying software 853 included on the computer-readable medium 810 to implement one or more of the functions described herein.

In some examples, the processor 804 may include inter-UE coordination criterion evaluating circuitry 844 configured to evaluate if at least one inter-UE coordination criterion is satisfied. Each of the inter-UE coordination criteria may be provided, at least in part, to possibly limit the number of sidelink UEs to which an assisting sidelink UE 800 may send conflict indications. Conversely, each of the inter-UE coordination criteria may be provided, at least in part, to possibly limit the number of assisting sidelink UEs that may send conflict indications to any one sidelink UE.

Some implications relating to inter-UE coordination criteria regarding service types and group memberships may be explained with the following examples. According to one example, for groupcast/broadcast sidelink communication, a Layer-2 destination ID may be mapped from service types; this may lead to an assisting sidelink UE sending a conflict indication (e.g., based at least on the HD constraint) if a first sidelink UE and a second sidelink UE transmit based on a same service type (in which case they may be the respective intended receivers of each other's transmission). The same may hold for unicast sidelink communication before an exchange of Layer-2 IDs. In such an example, a sidelink UE may first use a default Layer-2 destination ID, and the default Layer-2 destination ID may be the same for both the first sidelink UE and the second sidelink UE.

By way of additional example for groupcast, the Layer-2 destination ID may be mapped from a group ID if the group ID is available; this may lead to a case in which the first sidelink UE and the second sidelink UE belong to a same group in groupcast communication. Accordingly, the first sidelink UE and the second sidelink UE may receive packets from each other.

Still further, for a UE pair (e.g., the pair exemplified as the first sidelink UE and the second sidelink UE herein) engaging in unicast communication, the source ID of one of the UE pair may be the destination ID of the other one of the UE pair. Consequently, the unicast pair may be exchanging transmissions with each other.

Performing the process of evaluating if at least one inter-UE coordination criterion is satisfied may reduce the number of sidelink UEs being examined for conflicts. The reduction may reduce processing overhead that may, for example, otherwise be spent on determining to which sidelink UE the assisting sidelink UE should send the conflict indication. In some examples, the inter-UE coordination criterion evaluating circuitry 844 may include one or more hardware components that provide the physical structure that performs processes related to evaluating if at least one inter-UE coordination criterion is satisfied. The inter-UE coordination criterion evaluating circuitry 844 may further be configured to execute inter-UE coordination criterion evaluating software 854 included on the computer-readable medium 810 to implement one or more of the functions described herein.

The processor 804 may further include pre-conflict and/or post-conflict indication circuitry 845, configured for various functions, including, for example, sending a conflict indication to at least one of the first sidelink UE or the second sidelink UE in response to identifying a collision or a prospective collision. In other examples, the pre-conflict and/or post-conflict indication circuitry 845 may be configured for sending, responsive to determining that at least one inter-UE coordination criterion is satisfied, a conflict indication to at least one of: the first sidelink UE, or the second sidelink UE. According to some aspects, the conflict indication may be a pre-conflict indication, indicating to one or both of the first sidelink UE and the second sidelink UE that a conflict may occur. According to some aspects, the conflict indication may be a post-conflict indication, indicating to one or both of the first sidelink UE and the second sidelink UE that a conflict has occurred.

According to some aspects, the pre-conflict and/or post-conflict indication circuitry 845 may process information to determine whether to send the conflict indication and to which sidelink UE the conflict indication may be sent. By way of a first example, the conflict indication may be sent to both the first sidelink UE and the second sidelink UE. If the conflict indication is sent to both the first sidelink UE and the second sidelink UE, each UE will know of the potential or actual conflict, and each may take separate action to avoid the conflict.

By way of a second example, the conflict indication may be sent to one, but not both of the first sidelink UE and the second sidelink UE. If the conflict indication is sent to one, but not both of the first sidelink UE and the second sidelink UE, only one of the sidelink UEs will know of the potential or actual conflict. A rule that may determine the recipient of the conflict indication may be pre-determined and utilized in connection with the second example. Examples of possible rules are provided below.

According to a first example rule, the conflict indication may be sent to the conflicting UE having a smaller (or larger) Layer-1 source ID. According to a second example rule, the conflict indication may be sent to the conflicting UE having a smaller (or larger) Layer-1 destination ID. According to a third example rule, the conflict indication may be sent to the conflicting UE with a lower (or higher) traffic priority. An indicated traffic priority value may be provided in SCI. If provided in SCI, the indicated traffic priority value is zero for the highest traffic priority and increases as traffic priority decreases. According to a fourth example rule, the conflict indication may be sent to the conflicting UE with a smaller (or larger) physical distance (e.g., physical separation) from the assisting sidelink UE. The distance may be determined based, for example, on global navigation satellite system (GNSS) data (that may be obtainable from the hardware of a sidelink UE) or may be determined based on zone ID available/provided in SCI. According to a fifth example rule, the conflict indication may be sent to one of the conflicting UEs based on a random selection. According to aspects herein, all sidelink UEs may know the rule (exemplified but not limited to those example rules provided above) that is used to select one or more recipients of the conflict indication(s), so that, for example, there may be uniformity of practice among all sidelink UEs or specific groups of sidelink UEs.

Returning now to the examples of sending pre-conflict and/or post-conflict indications, by way of a third example, a conflict indication may be sent to both sidelink UEs if the conflict indication is for a post-conflict indication. According to this example, because the conflict has occurred (e.g., both sidelink UEs transmitted using the same or partially overlapped resources), neither sidelink UE would have received any message intended for it during the transmission (e.g., due to the HD constraint). Accordingly, this example may permit both sidelink UEs to act and possibly recover any messaging that may have been lost due to the conflict.

By way of a fourth example, a conflict indication may be sent to one sidelink UE if the conflict indication is for a pre-conflict indication. In this example, sending to one sidelink UE may be sufficient as the one sidelink UE may take action to avoid the conflict (and resources may not be wasted in sending the indication to the other sidelink UE). Having one sidelink UE take action to prevent a conflict before the conflict happens may cure the conflict for the other sidelink UE. This fourth example may be combined with the rules described in the second example. In this way, when a plurality of assisting sidelink UEs and several conflicting UEs are present, (each sidelink UE and assisting sidelink UE following a predefined rule used by all of the sidelink UEs (or by specific groups of sidelink UEs)) the plurality of assisting sidelink UEs may send respective conflict indications to only one of the conflicting sidelink UEs, where that one conflicting sidelink UE may be predetermined by uniform application of the rule.

In some examples, the pre-conflict and/or post-conflict indication circuitry 845 may include one or more hardware components that provide the physical structure that performs processes related to sending, responsive to determining that at least one inter-UE coordination criterion is satisfied, a conflict indication to at least one of the first sidelink UE, or the second sidelink UE. The pre-conflict and/or post-conflict indication circuitry 845 may further be configured to execute pre-conflict and/or post-conflict indication 855 software included on the computer-readable medium 810 to implement one or more of the functions described herein.

Figure 9:
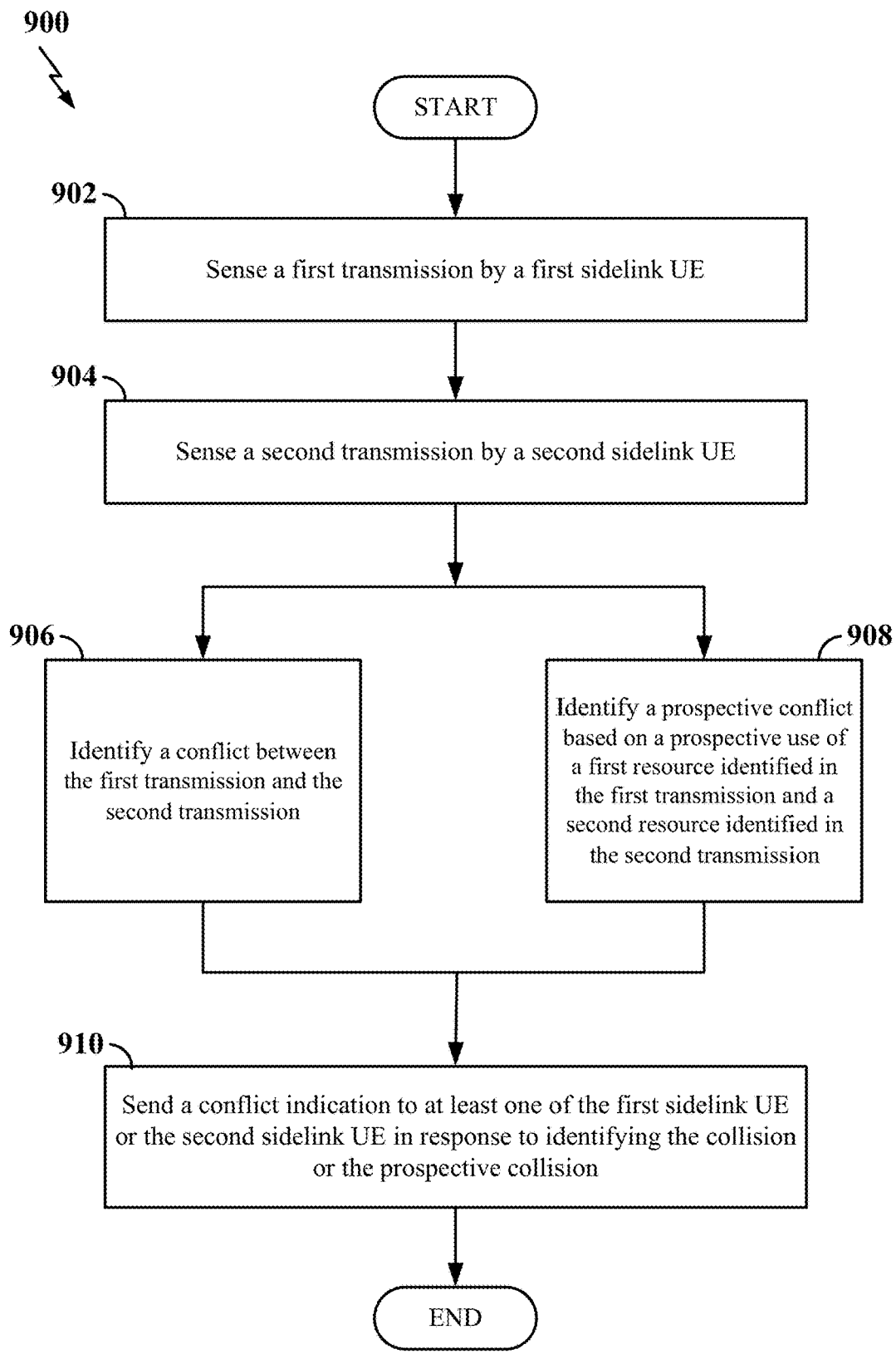
FIG. 9 is a flow chart illustrating an exemplary process at a UE configured as an assisting sidelink UE for inter-UE coordination of sidelink communications in a wireless communication network according to some aspects of the disclosure.

FIG. 9 is a flow chart illustrating an exemplary process 900 (e.g., a method) at a user equipment (UE) configured as an assisting sidelink UE for inter-UE coordination of sidelink communications in a wireless communication network according to some aspects of the disclosure. While the exemplary process 900 features the assisting sidelink UE, a first sidelink UE, and a second sidelink UE, those of ordinary skill in the art will understand that the process may be expanded to feature the assisting sidelink UE, the first sidelink UE, the second sidelink UE, and additional other sidelink UE(s) according to aspects of the disclosure.

As described below, some or all illustrated features may be omitted in a particular implementation within the scope of the present disclosure, and some illustrated features may not be required for implementation of all aspects. In some examples, the process 900 may be carried out by the assisting sidelink UE 800 as illustrated and described in connection with FIG. 8. In some examples, the process 900 may be carried out by any suitable apparatus or means for carrying out the functions or algorithm described below.

At block 902, an assisting sidelink UE may sense a first transmission by a first sidelink UE. At block 904, the assisting sidelink UE may sense a second transmission by a second sidelink UE. The sensing may be accomplished by monitoring a predefined set of resources and determining if any signaling and/or messaging is received in the predefined set of resources. For example, the antennas/antenna array 816, the transceiver 814, and the communication and processing circuitry 841, shown and described in connection with FIG. 8, may provide a means to sense the first transmission by the first sidelink UE and a means to sense the second transmission by the second sidelink UE according to any aspects described herein.

At block 906, the assisting sidelink UE may identify a collision between the first transmission and the second transmission (e.g., identify a present, actually occurrence of a collision). According to some aspects, a first transmission resource carries the first transmission and a second transmission resource carries the second transmission. The assisting sidelink UE may, for example, identify the collision by detecting if at least one of: a complete overlap of respective time resources and respective frequency resources of the first transmission resource and the second transmission resource occurs in a slot common to the first transmission resource and the second transmission resource, or a partial overlap of the respective time resources and/or the respective frequency resources of the first transmission resource and the second transmission resource occurs in the slot common to the first transmission resource and the second transmission resource, or any respective portion of the first transmission and the second transmission occurred in the slot common to the first transmission resource and the second transmission resource and the first sidelink UE and the second sidelink UE both operate in a half-duplex mode. For example, the collision identifying circuitry 843, shown and described in connection with FIG. 8, may provide a means to identify the collision between the first transmission and the second transmission according to any aspects described herein.

At 908, the assisting sidelink UE may identify a prospective collision based on a prospective use of a first resource identified in the first transmission and a second resource identified in the second transmission. According to some aspects, the assisting sidelink UE may identify the prospective collision by detecting, for example, if a complete overlap of respective time resources and respective frequency resources of the first resource and the second resource occurs in a slot common to the first resource and the second resource, or by detecting if a partial overlap of the respective time resources and/or the respective frequency resources of the first resource and the second resource prospectively occur in the slot common to the first resource and the second resource, or by detecting if any respective portion of the first resource and the second resource prospectively occupies the slot common to the first resource and the second resource and the first sidelink UE and the second sidelink UE prospectively operate in a half-duplex mode.

In some examples, the first resource may be a first reserved resource identified to the assisting sidelink UE in a first first-stage sidelink control information (SCI-1) received by the assisting sidelink UE from the first sidelink UE. The second resource may be a second reserved resource identified to the assisting sidelink UE in a second SCI-1 received by the assisting sidelink UE from the second sidelink UE. In other examples, the first resource may be a first preferred resource identified to the assisting sidelink UE in a first inter-UE coordination message in a first second-stage sidelink control information (SCI-2) received by the assisting sidelink UE from the first sidelink UE. The second resource may be a second preferred resource identified to the assisting sidelink UE in a second inter-UE coordination message in a second SCI-2 received by the assisting sidelink UE from the second sidelink UE. According to some aspects, the first preferred resource may be proposed to a second sidelink UE by the first sidelink UE for the second sidelink UE to utilize to schedule a first responsive transmission to be sent to the first sidelink UE by the second sidelink UE. In other aspects, the second preferred resource may be proposed to the first sidelink UE by the second sidelink UE for the first sidelink UE to utilize to schedule a second responsive transmission to be sent to the second sidelink UE by the first sidelink UE. For example, the collision identifying circuitry 843, shown and described in connection with FIG. 8, may provide a means to identify the prospective collision based on the prospective use of the first resource identified in the first transmission and the second resource identified in the second transmission, according to any aspects described herein.

Turning now to block 910, which can be reached via either or both blocks 906 and 908, the assisting sidelink UE may send a conflict indication to at least one of the first sidelink UE or the second sidelink UE in response to identifying the collision (e.g., at 906) or the prospective collision (e.g., at 908). While not shown in FIG. 9, the assisting sidelink UE may evaluate if at least one inter-UE coordination criterion is satisfied prior to identifying the collision or the prospective collision. If at least one of the inter-UE coordination criteria is satisfied, the assisting sidelink UE may send the conflict indication to the at least one of: the first sidelink UE, or the second sidelink UE.

Additionally or alternatively, the assisting sidelink UE may send the conflict indication, in response to identifying the collision or the prospective collision, if at least one of the following inter-UE coordination criteria is satisfied: the first sidelink UE and the second sidelink UE utilized a same transmission mode to transmit the first transmission and the second transmission, respectively, the first sidelink UE and the second sidelink UE utilized a same service type in association with respective transmissions of the first transmission and the second transmission, the first sidelink UE and the second sidelink UE transmitted the first transmission and the second transmission to a same group in respective groupcast transmissions, a first distance between the first sidelink UE and the assisting sidelink UE is within a predefined distance range, a second distance between the second sidelink UE and the assisting sidelink UE is within the predefined distance range, a first reference signal received power (RSRP) measured at the assisting sidelink UE is within a predefined RSRP range, or a second RSRP measured at the assisting sidelink UE is within the predefined RSRP range. According to some examples, the transmission mode may be at least one of: unicast, groupcast, or broadcast. According to some examples, the service type may be at least one of: enhanced mobile broadband (eMBB), ultra-reliable and low latency communications (URLLC), or massive internet of things (mIOT).

Additional examples of determinations as to whether to send a conflict indication include the following. According to one example, the assisting sidelink UE may detect a first destination identifier in the first transmission, detect a second destination identifier in the second transmission, and send the conflict indication in response to identifying the collision or the prospective collision if the first destination identifier and the second destination identifier are the same. According to another example, the assisting sidelink UE may detect a first source identifier (ID) and a first destination ID associated with the first transmission, detect a second source ID and a second destination ID associated with the second transmission, and send the conflict indication, in response to identifying the collision or the prospective collision, if: a first predetermined number of least significant bits (LSBs) of the first source ID is equal to a second predetermined number of LSBs of the second destination ID, or the first predetermined number of LSBs of the second source ID is equal to the second predetermined number of LSBs of the first destination ID.

In some examples, the assisting sidelink UE may obtain an indication(s) that the first sidelink UE and the second sidelink UE are communicating using half-duplex communication before beginning the process 900; however, this indication may be obtained, if needed, at any time according to processes known by those of skill in the art. In some examples, the assisting sidelink UE may obtain an indication(s) that the first sidelink UE and the second sidelink UE operate in a self-scheduling mode before beginning the process 900; however, this indication may be obtained, if needed, at any time according to processes known by those of skill in the art.

If the assisting sidelink UE exemplified herein determines to send the conflict indication, then the assisting sidelink UE may at least one of: send the conflict indication to both the first sidelink UE and the second sidelink UE, send the conflict indication to both the first sidelink UE and the second sidelink UE if the conflict indication is a post-conflict indication corresponding to the collision, send the conflict indication to one of either the first sidelink UE or the second sidelink UE according to a predefined rule, or send the conflict indication to one of either the first sidelink UE or the second sidelink UE if the conflict indication is a pre-conflict indication corresponding to the prospective collision.

In some examples, the predefined rule may indicate that the conflict indication may be sent to at least one of: the first sidelink UE or the second sidelink UE having a smaller Layer-1 source identifier (ID), the first sidelink UE or the second sidelink UE having a smaller Layer-1 destination ID, the first sidelink UE or the second sidelink UE having a lower traffic priority, the first sidelink UE or the second sidelink UE having a smaller determined distance from the assisting sidelink UE, the first sidelink UE or the second sidelink UE having a larger measured reference signal received power (RSRP) measured at the assisting sidelink UE, or the first sidelink UE or the second sidelink UE based on a random selection.

For example, the pre-conflict and/or post-conflict indication circuitry 845, shown and described in connection with FIG. 8, may provide a means to send a conflict indication to at least one of the first sidelink UE or the second sidelink UE in response to identifying the collision or the prospective collision according to any aspects described herein.

Figure 10:
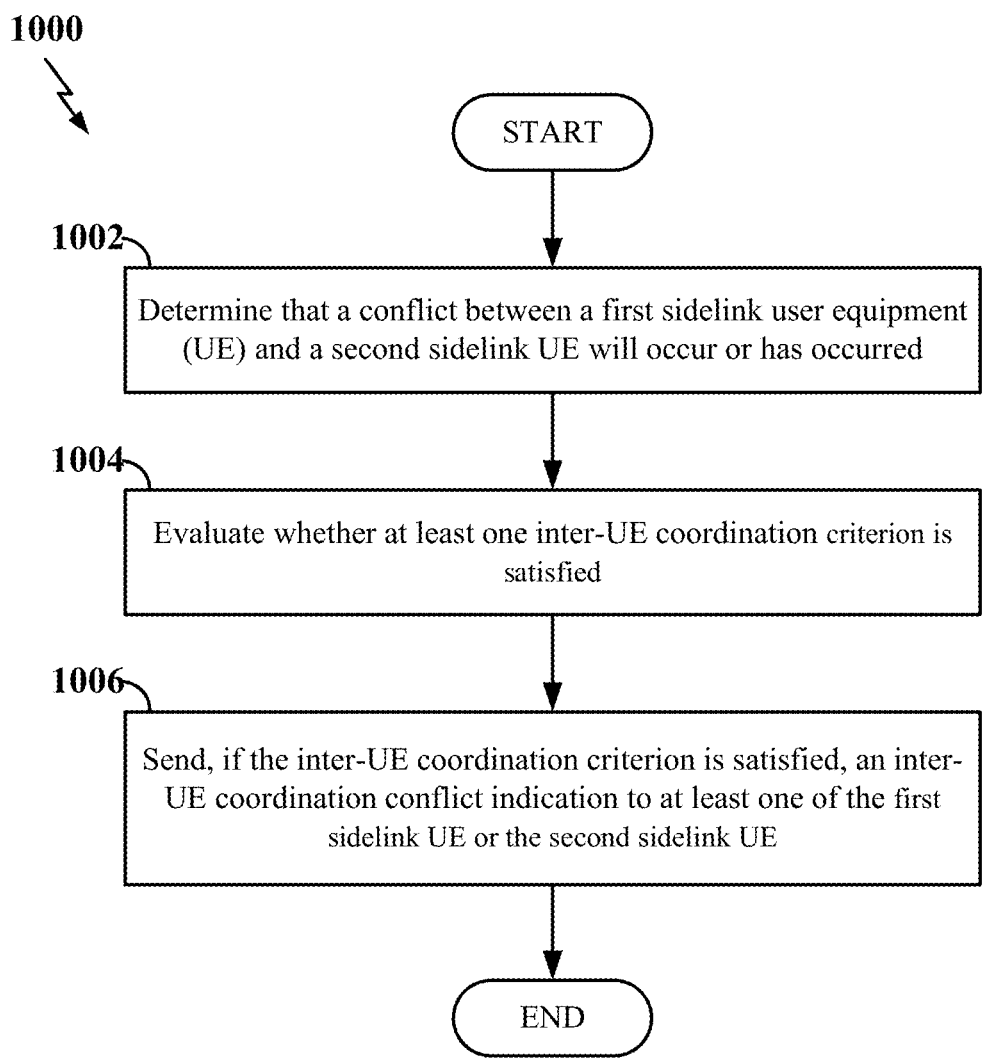
FIG. 10 is a flow chart illustrating an exemplary process at a UE configured as an assisting sidelink UE for inter-UE coordination of sidelink communications in a wireless communication network according to some aspects of the disclosure.

FIG. 10 is a flow chart illustrating an exemplary process 1000 (e.g., a method) at a user equipment (UE) configured as an assisting sidelink UE for inter-UE coordination of sidelink communications in a wireless communication network according to some aspects of the disclosure. While the exemplary process 1000 features the assisting sidelink UE, a first sidelink UE, and a second sidelink UE, those of ordinary skill in the art will understand that the process may be expanded to feature the assisting sidelink UE, the first sidelink UE, the second sidelink UE, and additional other sidelink UE(s) according to aspects of the disclosure.

As described below, some or all illustrated features may be omitted in a particular implementation within the scope of the present disclosure, and some illustrated features may not be required for implementation of all aspects. In some examples, the process 1000 may be carried out by the assisting sidelink UE 800 as illustrated and described in connection with FIG. 8. In some examples, the process 1000 may be carried out by any suitable apparatus or means for carrying out the functions or algorithm described below.

At block 1002, an assisting sidelink UE may determine that a conflict between a first sidelink UE and a second sidelink UE will occur or has occurred. There may be several examples of ways to determine that the conflict between the first sidelink UE and the second sidelink UE will occur or has occurred. The following examples are non-limiting. Other examples of ways to determine that a conflict between a first sidelink UE and a second sidelink UE will occur or has occurred are within the scope of the disclosure. Additionally, and by way of example, the collision identifying circuitry 843, shown and described in connection with FIG. 8, may provide a means to determine that the conflict between the first sidelink UE and the second sidelink UE will occur or has occurred.

According to one example, the process 1000 may further include: receiving a first message from the first sidelink UE including a first destination identifier, receiving a second message from the second sidelink UE including a second destination identifier. The assisting sidelink UE may determine that the conflict in resources between the first sidelink UE and the second sidelink UE will occur if the first destination identifier is equal to the second destination identifier.

According to another example, the process 1000 may further include: receiving a first message from the first sidelink UE including a first source identifier (ID) and a first destination ID, receiving a second message from the second sidelink UE including a second source ID, and a second destination ID. The assisting sidelink UE may determine that the conflict in resources between the first sidelink UE and the second sidelink UE will occur if at least one of: the first source ID is equal to the second destination ID, or the second source ID is equal to the first destination ID.

According to another example, the process 1000 may further include: receiving a first message from the first sidelink UE indicative of a first set of resources, receiving a second message from the second sidelink UE indicative of a second set of resources. The assisting sidelink UE may determine that the conflict in resources between the first sidelink UE and the second sidelink UE will occur if the first set of resources partially or completely overlaps the second set of resources.

According to another example, the process 1000 may further include: sensing that a first transmission from the first sidelink UE and a second transmission from the second sidelink UE have occurred. The assisting sidelink UE may determine that the conflict in resources between the first sidelink UE and the second sidelink UE has occurred if the first transmission and the second transmission were transmitted with at least one slot in common.

According to still another example, the first sidelink UE and the second sidelink UE may communicate in half-duplex and use self-scheduling (e.g., Mode 2 and/or Mode 4). The process 1000 may further include: comparing first information indicative of a first set of resources identified in a first message received from the first sidelink UE to second information indicative of a second set of resources identified in a second message received from the second sidelink UE. That is, the process 1000 may cause the assisting sidelink UE to compare first information indicative of the first set of resources identified in a first message received from the first sidelink UE to second information indicative of the second set of resources identified in a second message received from the second sidelink UE. The assisting sidelink UE may determine that the conflict between the first sidelink UE and the second sidelink UE will occur or has occurred if the first set of resources overlaps with the second set of resources. According to some aspects, the first set of resources may be utilized by the second sidelink UE to transmit a first transmission to the first sidelink UE, and/or the second set of resources may be utilized by the first sidelink UE to transmit a second transmission to the second sidelink UE. For example, the collision identifying circuitry 843, shown and described in connection with FIG. 8, may provide a means to determine that the conflict between the first sidelink UE and the second sidelink UE will occur or has occurred according to any of the examples described above.

At block 1004, the assisting sidelink UE may evaluate if at least one inter-UE coordination criterion is satisfied. There may be several examples of ways to evaluate if at least one inter-UE coordination criterion is satisfied. The following example is non-limiting. Other examples of ways to evaluate if at least one inter-UE coordination criterion is satisfied are within the scope of the disclosure. Additionally, and by way of example, inter-UE coordination criterion evaluating circuitry 844, shown and described in connection with FIG. 8, may provide a means to evaluate if at least one inter-UE coordination criterion is satisfied.

According to one example, the process may further include receiving a first message from the first sidelink UE indicative of a first set of resources used by the second sidelink UE to transmit a second transmission, receiving a second message from the second sidelink UE indicative of a second set of resources used by the first sidelink UE to transmit a first transmission, and evaluating if at least one inter-UE coordination criterion is satisfied. The assisting sidelink UE may perform the evaluation by, for example, determining if at least one of the following is true:

the first control message and the second message have a same transmission mode,
the first transmission of the first sidelink UE and the second transmission of the second sidelink UE have a same service type, or
the first transmission of the first sidelink UE and the second transmission of the second sidelink UE may be respective groupcast transmissions to a same group.

According to some examples, the above-recited transmission mode may be at least one of: unicast, groupcast, or broadcast. The above-recited service type may be at least one of: enhanced mobile broadband (eMBB), ultra-reliable and low latency communications (URLLC), or massive Internet of Things (mIoT). As understood by those of ordinary skill in the art, the eMBB service type may support high data rates and high traffic densities. The URLLC service type may support performance requirements for low-latency and high-reliability services. The mIoT service type may support a large number and high density of IoT devices efficiently and cost-effectively.

Additionally, and for example, the inter-UE coordination criterion evaluating circuitry 844, shown and described in connection with FIG. 8, may provide a means to evaluate if at least one inter-UE coordination criterion is satisfied according to the example above.

At block 1006, the assisting sidelink UE may send, if at least one inter-UE coordination criterion is satisfied, a conflict indication to at least one of: the first sidelink UE, or the second sidelink UE. There may be several examples of how to determine the recipient of a conflict indication and whether to send the conflict indication (to the first sidelink UE, the second sidelink UE, or both the first sidelink UE and the second sidelink UE, or not at all). The following examples are non-limiting, other examples of ways to send, if at least one inter-UE coordination criterion is satisfied, a conflict indication to the first sidelink UE, the second sidelink UE, or both the first sidelink UE and the second sidelink UE are within the scope of the disclosure. Additionally, and by way of an example, the pre-conflict and/or post-conflict indication circuitry 845, shown and described in connection with FIG. 8, may provide a means to send, if at least one inter-UE coordination criterion is satisfied, the conflict indication to the first sidelink UE, the second sidelink UE, or both the first sidelink UE and the second sidelink UE.

According to one example, the assisting sidelink UE may determine if the assisting sidelink UE has a same service type or belongs to a same group as either the first sidelink UE or the second sidelink UE. The assisting sidelink UE may send the conflict indication to one or more of the first sidelink UE and the second sidelink UE having the same service type or belonging to the same group as the assisting sidelink UE.

According to another example, the assisting sidelink UE may determine a respective distance between the assisting sidelink UE and the first sidelink UE and between the assisting sidelink UE and the second sidelink UE. The assisting sidelink UE may send the conflict indication to one or more of the first sidelink UE and the second sidelink UE having the respective distance that is within a pre-defined distance threshold. The distance threshold may include an upper bound, a lower bound, or both upper and lower bounds. For example, an assisting sidelink UE may send a conflict indication if the determined distance is larger than a lower bound, smaller than an upper bound, or within the lower and upper bounds. The distance may be determined, for example, based on UE location (e.g., as determined by a GNSS) or by zone ID, which may be available in SCI.

According to another example, the assisting sidelink UE may measure a reference signal received power (RSRP) of the first sidelink UE and of the second sidelink UE. The assisting sidelink UE may send the conflict indication to one or more of the first sidelink UE and the second sidelink UE having a larger measured RSRP or a respective RSRP within a pre-defined RSRP threshold. Here it may be recognized that there may be an inverse relationship between RSRP and distance. The larger the RSRP measured by a receiving sidelink UE, the closer the physical distance is to the transmitting sidelink UE. Of course, like the distance thresholds, the pre-defined RSRP bounds may be expressed as an upper bound, a lower bound, or both upper and lower bounds.

The conditions above and/or other conditions may limit a number of assisting sidelink UEs (e.g., sidelink UEs that may send conflict indications). The conditions may help avoid having too many assisting sidelink UEs sending conflict indications to other sidelink UEs.

According to still another example, the assisting sidelink UE may, for example, do at least one of the following:
- send the conflict indication to both the first sidelink UE and the second sidelink UE,
- send the conflict indication to both the first sidelink UE and the second sidelink UE if the conflict indication is a post-conflict indication,
- send the conflict indication to one of either the first sidelink UE or the second sidelink UE according to a predefined rule, or
- send the conflict indication to one of either the first sidelink UE or the second sidelink UE if the conflict indication is a pre-conflict indication.

By way of further example and not limitation, the above-recited predefined rule may indicate that the conflict indication may be sent to at least one of:
- the first sidelink UE or the second sidelink UE having a smaller (or larger) Layer-1 source ID,
- the first sidelink UE or the second sidelink UE having a smaller (or larger) Layer-1 destination ID,
- the first sidelink UE or the second sidelink UE having a lower traffic priority,
- the first sidelink UE or the second sidelink UE having a smaller (or larger) determined distance from the assisting sidelink UE,
- the first sidelink UE or the second sidelink UE having a larger (or smaller) measured RSRP, or
- the first sidelink UE or the second sidelink UE based on a random selection.

The preceding lists are exemplary and non-limiting. For example, the pre-conflict and/or post-conflict indication circuitry 845, shown and described in connection with FIG. 8, may provide a means to send, if at least one inter-UE coordination criterion is satisfied, the conflict indication to at least the first sidelink UE, or the second sidelink UE, all according to the examples described above.

According to some aspects, the previously recited feature of evaluating if at least one inter-UE coordination criterion is satisfied prior to a determining that the conflict in resources will occur or has occurred may be performed prior to the feature of determining that the conflict in resources will occur or has occurred, and the feature of determining that the conflict in resources will occur or has occurred may be performed only if at least one inter-UE coordination criterion is satisfied. According to aspects described herein, the first sidelink UE and the second sidelink UE communicate using half-duplex communication and autonomously operate in Mode 2 (and/or Mode 4).

Figure 11:
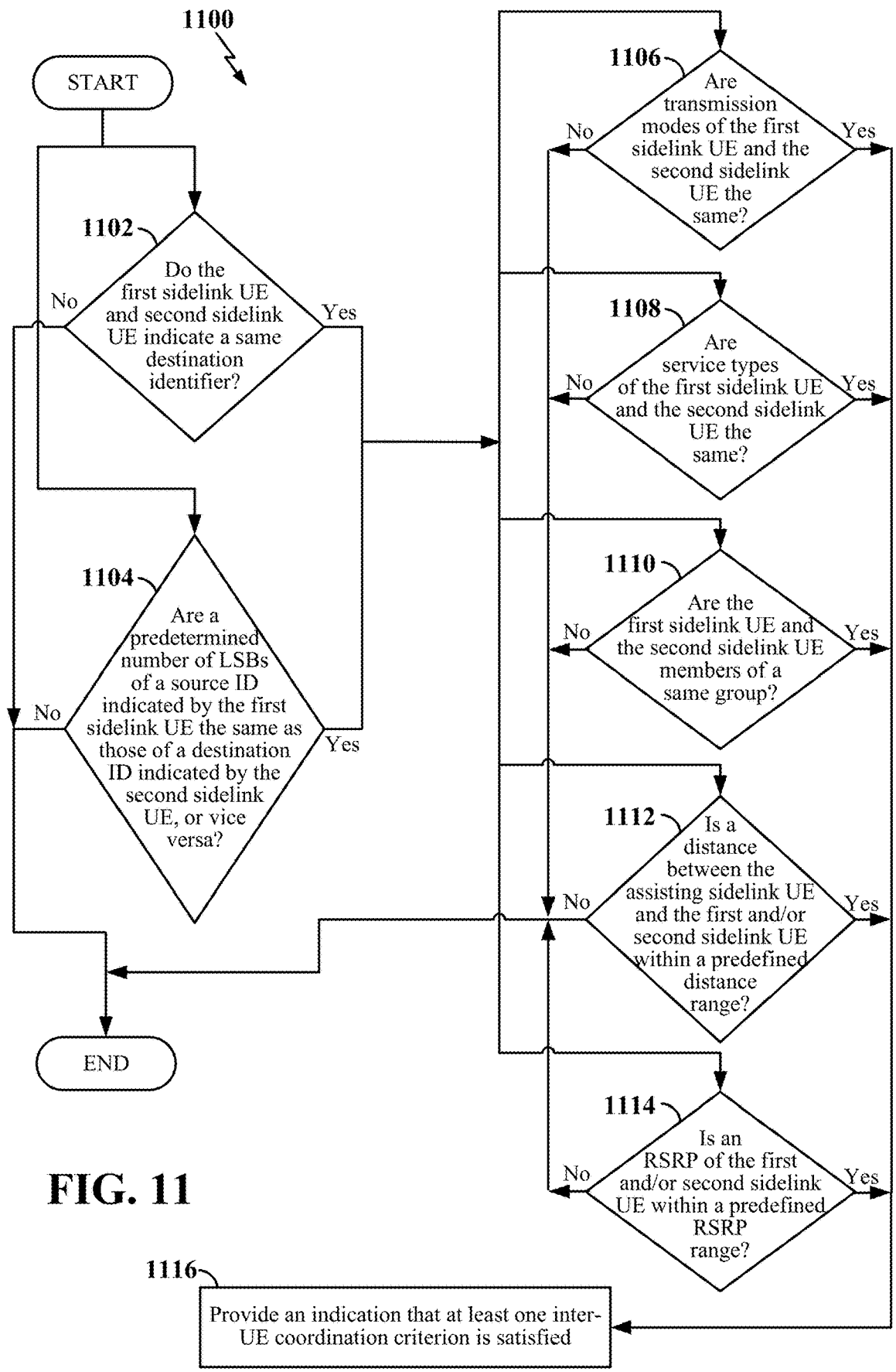
FIG. 11 is a flow chart illustrating an exemplary process at a UE configured as an assisting sidelink UE for inter-UE coordination of sidelink communications in a wireless communication network according to some aspects of the disclosure.

FIG. 11 is a flow chart illustrating an exemplary process 1100 (e.g., a method) at a user equipment (UE) configured as an assisting sidelink UE for inter-UE coordination of sidelink communications in a wireless communication network according to some aspects of the disclosure. The process 1100 may be used, for example, at an assisting sidelink UE in a wireless communication network. The process 1100 may be used to provide an indication of whether at least one inter-UE coordination criterion is satisfied according to some aspects of the disclosure. The assisting sidelink UE may be any of UE 138, UE 140, or UE 142 as illustrated and described in connection with FIG. 1 and/or any of the vehicles or UEs illustrated and described in FIG. 3 (of course, to be configured as an assisting sidelink UE according to some aspects of the disclosure, the UEs and vehicles would be configured to operate autonomously in sidelink Mode 2 (and/or Mode 4) out of range of the base station 310, for example). According to some aspects of the disclosure, the assisting sidelink UE may also be any of the sidelink UEs of FIGS. 6, 7, and 8. While the process 1100 features the assisting sidelink UE, a first sidelink UE, and a second sidelink UE, those of ordinary skill in the art will understand that the process 1100 may be expanded to feature the assisting sidelink UE, the first sidelink UE, the second sidelink UE, and additional other sidelink UE(s) according to some aspects of the disclosure.

At the start of the process 1100, one or both of two parallel decisions may be reached. The first of the two parallel decisions may be reached at block 1102, where the assisting sidelink UE (e.g., similar to the assisting sidelink UE 800 described and illustrated in connection with FIG. 8) may determine if a first sidelink UE and a second sidelink UE indicated a same destination identifier in respective messaging information received by the assisting sidelink UE. The second of the two parallel decisions may be reached at block 1104, where the assisting sidelink UE may determine if a first predetermined number of least significant bits (LSBs) of a source identifier (ID) identified in the messaging information received from the first sidelink UE matches a second predetermined number of LSBs of a destination ID identified in the messaging information received from the second sidelink UE, or vice versa. According to some aspects, the predetermined number of LSBs may be 10 or 16 LSBs. According to some aspects of the disclosure, one or both of the two parallel decisions may be reached by the assisting sidelink UE. If only one of the two parallel decisions is reached, and the outcome of the decision is positive ("Yes" branch), the other decision may be ignored.

If the determination at block 1102 is negative ("No" branch), the process 1100 including the branch that includes block 1102 may end. Likewise, if the determination at block 1104 is negative ("No" branch), the process 1100 including the branch that includes block 1104 may end. However, it is noted that the ending of one branch does not necessarily result in the ending of the other branch as both branches are parallel.

If the determination at block 1102, block 1104, or both block 1102 and block 1104 is positive ("Yes" branch), the process 1100 may proceed to the five parallel optional blocks (e.g., optional decisions) depicted in FIG. 11. At optional block 1106, the assisting sidelink UE may determine if transmission modes of the first sidelink UE and the second sidelink UE may be the same. At optional block 1108, the assisting sidelink UE may determine if a service type of the first sidelink UE matches that of the second sidelink UE. At optional block 1110, the assisting sidelink UE may determine if the first sidelink UE or the second sidelink UE is a member of a same group. At optional block 1112, the assisting sidelink UE may determine if a distance between the assisting sidelink UE and the first and/or second sidelink UE is within a predefined distance range. At optional block 1114, the assisting sidelink UE may determine if an RSRP of the first and/or second sidelink UE (as measured at and by the assisting sidelink UE) is within a predefined RSRP range.

If the determination at optional block 1106 is negative ("No" branch), the process 1100 may end for the branch that includes optional block 1106. If the determination at optional block 1108 is negative ("No" branch), the process 1100 may end for the branch that includes optional block 1108. If the determination at optional block 1110 is negative ("No" branch), the process 1100 may end for the branch that includes optional block 1110. If the determination at optional block 1112 is negative ("No" branch), the process 1100 may end for the branch that includes optional block 1112. If the determination at optional block 1114 is negative ("No" branch), the process 1100 may end for the branch that includes optional block 1114. Accordingly, due to the parallelism of the optional block 1106, optional block 1108, optional block 1110, optional block 1112, and optional block 1114, the optional blocks may be independent of one another.

If the determination at any of optional block 1106, optional block 1108, optional block 1110, optional block 1112, or optional block 1114 is positive ("Yes" branch), the process 1100 may proceed to block 1116, where the assisting sidelink UE may provide an indication that at least one inter-UE coordination criterion is satisfied For example, inter-UE coordination criterion evaluating circuitry 844 as shown and described in connection with FIG. 8, may provide a means to perform any of the decisions and selections of block 1102, block 1104, optional block 1106, optional block 1108, optional block 1110, optional block 1112, and/or optional block 1114.

Figure 12:
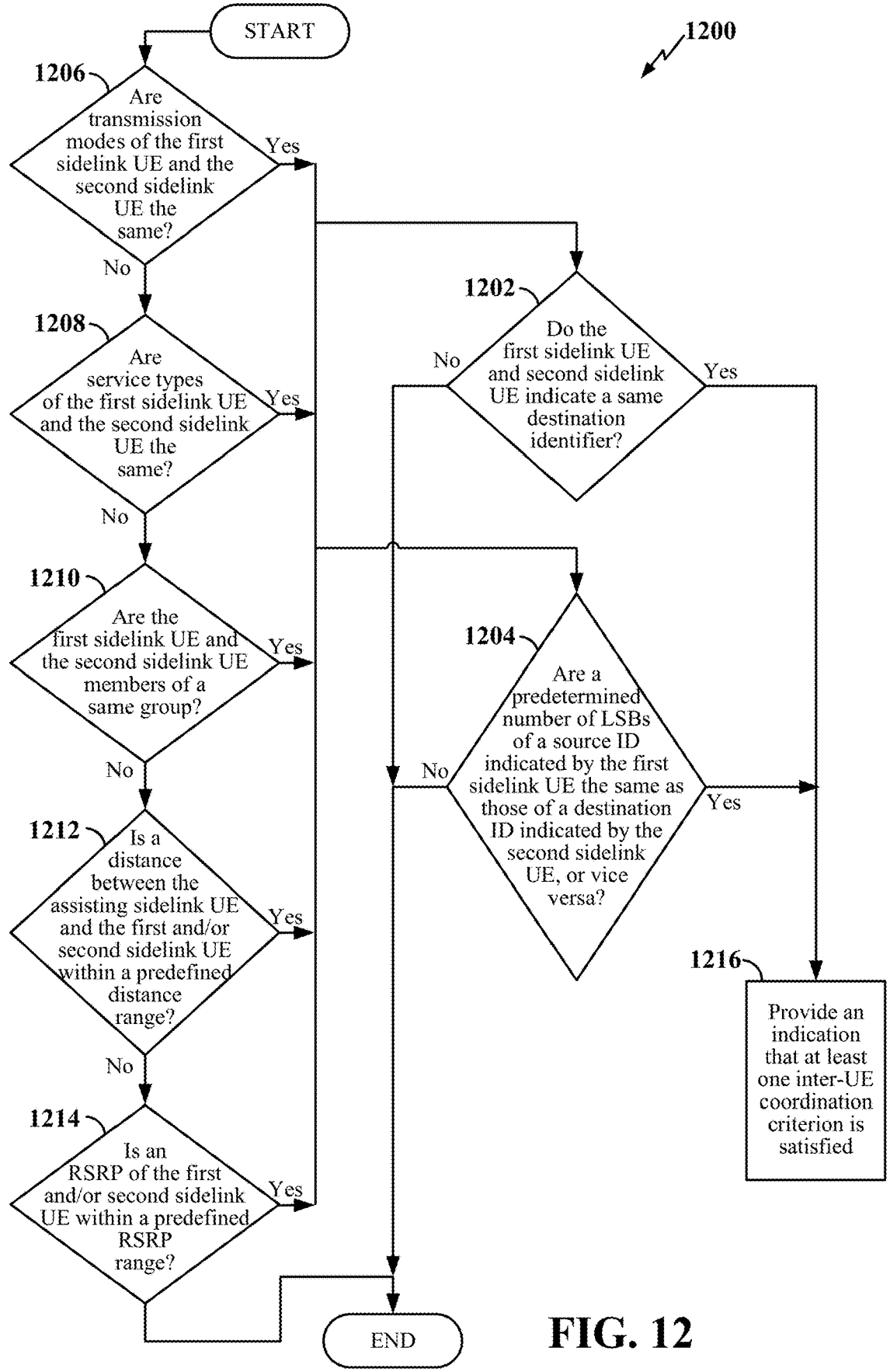
FIG. 12 is a flow chart illustrating an exemplary process at a UE configured as an assisting sidelink UE for inter-UE coordination of sidelink communications in a wireless communication network according to some aspects of the disclosure.

FIG. 12 is a flow chart illustrating an exemplary process 1200 (e.g., a method) at a user equipment (UE) configured as an assisting sidelink UE for inter-UE coordination of sidelink communications in a wireless communication network according to some aspects of the disclosure. The process 1200 may be used, for example, at an assisting sidelink UE in a wireless communication network. The process 1200 may be used to provide an indication of whether at least one inter-UE coordination criterion is satisfied according to some aspects of the disclosure. FIG. 12 is similar to FIG. 11, except the process 1200 of FIG. 12 performs several decisions and selections in reverse order to those found in FIG. 11. By practicing the aspects of FIG. 12, for example, the assisting sidelink UE may avoid (e.g., filter out) decisions that that may entail extra processing time.

As in connection with FIG. 11, the assisting sidelink UE may be any of UE 138, UE 140, or UE 142 as illustrated and described in connection with FIG. 1 and/or any of the vehicles or UEs illustrated and described in FIG. 3 (of course, to be configured as an assisting sidelink UE according to some aspects of the disclosure, the UEs and vehicles would be configured to operate autonomously in a self-scheduling mode (e.g., Mode 2 and/or Mode 4) out of range of the base station 310, for example). According to some aspects of the disclosure, the assisting sidelink UE may also be any of the sidelink UEs of FIGS. 6, 7, and 8. Also, as mentioned in connection with FIG. 11, while the process 1200 features the assisting sidelink UE, a first sidelink UE, and a second sidelink UE, those of ordinary skill in the art will understand that the process 1200 may be expanded to feature the assisting sidelink UE, the first sidelink UE, the second sidelink UE, and additional other sidelink UE(s) according to some aspects of the disclosure.

Starting at optional block 1206, the assisting sidelink UE may determine if transmission modes of the first sidelink UE and the second sidelink UE may be the same. If the determination at optional block 1206 is negative ("No" branch), the process 1200 may continue to optional block 1208. At optional block 1208, the assisting sidelink UE may determine if a service type of the assisting sidelink UE matches that of the first sidelink UE or the second sidelink UE. If the determination at optional block 1208 is negative ("No" branch), the process 1200 may continue to optional block 1210. At optional block 1210, the assisting sidelink UE may determine if the first sidelink UE or the second sidelink UE is a member of a same group as the assisting sidelink UE. If the determination at optional block 1210 is negative ("No" branch), the process 1200 may continue to optional block 1212. At optional block 1212, the assisting sidelink UE may determine if a distance between the assisting sidelink UE and the first and/or second sidelink UE is within a predefined distance range. If the determination at optional block 1212 is negative ("No" branch), the process 1200 may continue to optional block 1214. At optional block 1214, the assisting sidelink UE may determine if an RSRP of the first and/or second sidelink UE (as measured at and by the assisting sidelink UE) is within a predefined RSRP range. If the determination at optional block 1214 is negative ("No" branch), the process 1200 may end. No sidelink UEs satisfy at least the criteria set out in optional block 1206, optional block 1208, optional block 1210, optional block 1212, and optional block 1214. Accordingly, additional processing time that may have been used for processing at block 1202 and/or block 1204 may be avoided.

Returning to optional block 1206, if the determination at optional block 1206 is positive ("Yes" branch), the process 1200 may proceed to the parallel blocks identified as block 1202 and block 1204. Likewise, returning to optional block 1208, if the determination at optional block 1208 is positive ("Yes" branch), the process 1200 may also proceed to the parallel blocks identified as block 1202 and block 1204. Likewise, returning to optional block 1210, if the determination at optional block 1210 is positive ("Yes" branch), the process 1200 may also proceed to the parallel blocks identified as block 1202 and block 1204. Likewise, returning to optional block 1212, if the determination at optional block 1212 is positive ("Yes" branch), the process 1200 may also proceed to the parallel blocks identified as block 1202 and block 1204. Likewise, returning to optional block 1214, if the determination at optional block 1214 is positive ("Yes" branch), the process 1200 may also proceed to the parallel blocks identified as block 1202 and block 1204.

At block 1202, the assisting sidelink UE (e.g., similar to the assisting sidelink UE 800 described and illustrated in connection with FIG. 8) may determine if a first sidelink UE and a second sidelink UE indicated a same destination identifier in respective messaging/information received by the assisting sidelink UE. If the determination at block 1202 is negative ("No" branch), the branch of the process 1200 that includes block 1202 may end; however, because block 1202 is in parallel with block 1204, the process 1200 as a whole may not end. Instead, the decision at block 1204 may be considered.

At block 1204, the assisting sidelink UE may determine if a first predetermined number of least significant bits (LSBs) of a source identifier (ID) identified in the messaging/information received from the first sidelink UE are the same as those of a destination ID identified in the messaging/information received from the second sidelink UE, or vice versa. If the determination at block 1104 is negative ("No" branch), the branch of the process 1200 that includes block 1204 may end; however, as noted above, because block 1204 is in parallel with block 1202, the process 1200 as a whole may not end. If not previously considered, the decision at block 1202 may then be considered.

If the determination at block 1202, or at block 1204, or at both block 1202 and block 1204 is positive ("Yes" branch), the process 1200 may proceed to block 1216, where the assisting sidelink UE may provide an indication that at least one inter-UE coordination criterion is satisfied. If the decision made at one parallel block (e.g., block 1202 or block 1204) is positive (e.g., the Yes branch), then the other parallel block may be considered or ignored.

While blocks 1106, 1108, 1110, 1112, and 1114 of FIG. 11 and blocks 1206, 1208, 1210, 1212, and 1214 of FIG. 12 are described as optional, any or all of these blocks may alternatively be shown non-optional and continue to be within the scope of the disclosure.

For example, inter-UE coordination criterion evaluating circuitry 844 as shown and described in connection with FIG. 8, may provide a means to perform any of the decisions/determinations/evaluations of block 1202, block 1204, optional block 1206, optional block 1208, optional block 1210, optional block 1212, and/or optional block 1214.

Of course, in the above examples, the circuitry included in the processor 804 is merely provided as an example, and other means for carrying out the described functions may be included within various aspects of the present disclosure, including but not limited to the instructions stored in the computer-readable medium 810, or any other suitable apparatus or means described in any one of the FIGS. 1, 3, and/or 6-8, and utilizing, for example, the processes and/or algorithms described herein in relation to FIGS. 9, 10, 11, and/or 12.

The following provides an overview of aspects of the present disclosure:

Aspect 1: A user equipment (UE) configured as an assisting sidelink UE for inter-UE coordination of sidelink communications in a wireless communication network, comprising: a transceiver, a memory, and a processor communicatively coupled to the transceiver and the memory, wherein the processor and the memory are configured to: sense a first transmission by a first sidelink UE, sense a second transmission by a second sidelink UE, and send a conflict indication to at least one of the first sidelink UE or the second sidelink UE in response to identifying: a collision between the first transmission and the second transmission, or a prospective collision based on a prospective use of a first resource identified in the first transmission and a second resource identified in the second transmission.

Aspect 2: The UE of aspect 1, wherein a first transmission resource carries the first transmission and a second transmission resource carries the second transmission and the processor and the memory are configured to identify the collision by being further configured to detect if at least one of: a complete overlap of respective time resources and respective frequency resources of the first transmission resource and the second transmission resource occurs in a slot common to the first transmission resource and the second transmission resource, a partial overlap of the respective time resources and/or the respective frequency resources of the first transmission resource and the second transmission resource occurs in the slot common to the first transmission resource and the second transmission resource, or any respective portion of the first transmission and the second transmission occurred in the slot common to the first transmission resource and the second transmission resource and the first sidelink UE and the second sidelink UE both operate in a half-duplex mode.

Aspect 3: The UE of aspect 1 or 2, wherein the processor and the memory are configured to identify the prospective collision by being further configured to detect if at least one of: a complete overlap of respective time resources and respective frequency resources of the first resource and the second resource occurs in a slot common to the first resource and the second resource, a partial overlap of the respective time resources and/or the respective frequency resources of the first resource and the second resource prospectively occur in the slot common to the first resource and the second resource, or any respective portion of the first resource and the second resource prospectively occupies the slot common to the first resource and the second resource and the first sidelink UE and the second sidelink UE prospectively operate in a half-duplex mode.

Aspect 4: The UE of aspect 3, wherein: the first resource is a first reserved resource identified to the UE in a first first-stage sidelink control information (SCI-1) received by the UE from the first sidelink UE and the second resource is a second reserved resource identified to the UE in a second SCI-1 received by the UE from the second sidelink UE; or the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

Aspect 5: The UE of aspect 4, wherein at least one of: the first preferred resource is proposed to the second sidelink UE by the first sidelink UE for the second sidelink UE to utilize to schedule a first responsive transmission to be sent to the first sidelink UE by the second sidelink UE, or the second preferred resource is proposed to the first sidelink UE by the second sidelink UE for the first sidelink UE to utilize to schedule a second responsive transmission to be sent to the second sidelink UE by the first sidelink UE.

Aspect 6: The UE of any of aspects 1 through 5, wherein: the first sidelink UE and the second sidelink UE communicate using half-duplex communication, and the first sidelink UE and the second sidelink UE operate in a self-scheduling mode.

Aspect 7: The UE of any of aspects 1 through 6, wherein the processor and the memory are further configured to: evaluate if at least one inter-UE coordination criterion is satisfied prior to identifying the collision or the prospective collision; and identify the collision or the prospective collision if the at least one inter-UE coordination criterion is satisfied.

Aspect 8: The UE of any of aspects 1 through 7, wherein the processor and the memory are further configured to: detect a first destination identifier in the first transmission; detect a second destination identifier in the second transmission; and send the conflict indication, in response to identifying the collision or the prospective collision, if the first destination identifier and the second destination identifier are the same.

Aspect 9: The UE of any of aspects 1 through 8, wherein the processor and the memory are further configured to: detect a first source identifier (ID) and a first destination ID associated with the first transmission; detect a second source ID and a second destination ID associated with the second transmission; and send the conflict indication, in response to identifying the collision or the prospective collision, if: a first predetermined number of least significant bits (LSBs) of the first source ID is equal to a second predetermined number of LSBs of the second destination ID, or the first predetermined number of LSBs of the second source ID is equal to the second predetermined number of LSBs of the first destination ID.

Aspect 10: The UE of any of aspects 1 through 9, wherein the processor and the memory are further configured to: send the conflict indication, in response to identifying the collision or the prospective collision, if at least one of the following inter-UE coordination criteria is satisfied: the first sidelink UE and the second sidelink UE utilized a same transmission mode to transmit the first transmission and the second transmission, respectively, the first sidelink UE and the second sidelink UE utilized a same service type in association with respective transmissions of the first transmission and the second transmission, the first sidelink UE and the second sidelink UE transmitted the first transmission and the second transmission to a same group in respective groupcast transmissions, a first distance between the first sidelink UE and the assisting sidelink UE is within a predefined distance range, a second distance between the second sidelink UE and the assisting sidelink UE is within the predefined distance range, a first reference signal received power (RSRP) measured at the assisting sidelink UE is within a predefined RSRP range, or a second RSRP measured at the assisting sidelink UE is within the predefined RSRP range.

Aspect 11: The UE of aspect 10, wherein: the transmission mode is at least one of: unicast, groupcast, or broadcast.

Aspect 12: The UE of aspects 1 through 11, wherein the service type is at least one of: enhanced mobile broadband (eMBB), ultra-reliable and low latency communications (URLLC), or massive internet of things (mIOT).

Aspect 13: The UE of any of aspects 1 through 12, wherein the processor and the memory are further configured to at least one of: send the conflict indication to both the first sidelink UE and the second sidelink UE, send the conflict indication to both the first sidelink UE and the second sidelink UE if the conflict indication is a post-conflict indication corresponding to the collision, send the conflict indication to one of either the first sidelink UE or the second sidelink UE according to a predefined rule, or send the conflict indication to one of either the first sidelink UE or the second sidelink UE if the conflict indication is a pre-conflict indication corresponding to the prospective collision.

Aspect 14: The UE of aspect 13, wherein the predefined rule indicates that the conflict indication is sent to at least one of: the first sidelink UE or the second sidelink UE having a smaller Layer-1 source identifier (ID), the first sidelink UE or the second sidelink UE having a smaller Layer-1 destination ID, the first sidelink UE or the second sidelink UE having a lower traffic priority, the first sidelink UE or the second sidelink UE having a smaller determined distance from the assisting sidelink UE, the first sidelink UE or the second sidelink UE having a larger measured reference signal received power (RSRP) measured at the assisting sidelink UE, or the first sidelink UE or the second sidelink UE based on a random selection.

Aspect 15: A method at a user equipment (UE) configured as an assisting sidelink UE for inter-UE coordination of sidelink communications in a wireless communication network, comprising: sensing a first transmission by a first sidelink UE, sensing a second transmission by a second sidelink UE, and sending a conflict indication to at least one of the first sidelink UE or the second sidelink UE in response to identifying: a collision between the first transmission and the second transmission, or a prospective collision based on a prospective use of a first resource identified in the first transmission and a second resource identified in the second transmission.

Aspect 16: The method of aspect 15, wherein a first transmission resource carries the first transmission and a second transmission resource carries the second transmission, and the method further comprises: identifying the collision by detecting if at least one of: a complete overlap of respective time resources and respective frequency resources of the first transmission resource and the second transmission resource occurs in a slot common to the first transmission resource and the second transmission resource, a partial overlap of the respective time resources and/or the respective frequency resources of the first transmission resource and the second transmission resource occurs in the slot common to the first transmission resource and the second transmission resource, or any respective portion of the first transmission and the second transmission occurs in the slot common to the first transmission resource and the second transmission resource and the first sidelink UE and the second sidelink UE both operate in a half-duplex mode.

Aspect 17: The method of aspect 15 or 16, wherein the method further comprises: identifying the prospective collision by detecting if at least one of: a complete overlap of respective time resources and respective frequency resources of the first resource and the second resource prospectively occurs in a slot common to the first resource and the second resource, a partial overlap of the respective time resources and/or the respective frequency resources of the first resource and the second resource prospectively occurs in the slot common to the first resource and the second resource, or any respective portion of the first resource and the second resource prospectively occupies the slot common to the first resource and the second resource and the first sidelink UE and the second sidelink UE prospectively operate in a half-duplex mode.

Aspect 18: The method of aspect 17, wherein: the first resource is a first reserved resource identified to the UE in a first first-stage sidelink control information (SCI-1) received by the UE from the first sidelink UE and the second resource is a second reserved resource identified to the UE in a second SCI-1 received by the UE from the second sidelink UE; or the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

Aspect 19: The method of aspect 18, wherein at least one of: the first preferred resource is proposed to the second sidelink UE by the first sidelink UE for the second sidelink UE to utilize to schedule a first responsive transmission to be sent to the first sidelink UE by the second sidelink UE, or the second preferred resource is proposed to the first sidelink UE by the second sidelink UE for the first sidelink UE to utilize to schedule a second responsive transmission to be sent to the second sidelink UE by the first sidelink UE.

Aspect 20: The method of any of aspects 15 through 19, wherein: the first sidelink UE and the second sidelink UE communicate using half-duplex communication, and the first sidelink UE and the second sidelink UE operate in a self-scheduling mode.

Aspect 21: The method of any of aspects 15 through 20, wherein the method further comprises: evaluating if at least one inter-UE coordination criterion is satisfied prior to identifying the collision or the prospective collision; and identifying the collision or the prospective collision if the at least one inter-UE coordination criterion is satisfied.

Aspect 22: The method of any of aspects 15 through 21, wherein the method further comprises: detecting a first destination identifier in the first transmission; detecting a second destination identifier in the second transmission; and sending the conflict indication, in response to identifying the collision or the prospective collision, if the first destination identifier and the second destination identifier are the same.

Aspect 23: The method of any of aspects 15 through 22, wherein the method further comprises: detecting a first source identifier (ID) and a first destination ID associated with the first transmission; detecting a second source ID and a second destination ID associated with the second transmission; and sending the conflict indication, in response to identifying the collision or the prospective collision, if: a first predetermined number of least significant bits (LSBs) of the first source ID is equal to a second predetermined number of LSBs of the second destination ID, or the first predetermined number of LSBs of the second source ID is equal to the second predetermined number of LSBs of the first destination ID.

Aspect 24: The method of any of aspects 15 through 23, wherein the method further comprises: sending the conflict indication, in response to identifying the collision or the prospective collision, if at least one of the following inter-UE coordination criteria is satisfied: the first sidelink UE and the second sidelink UE utilized a same transmission mode to transmit the first transmission and the second transmission, respectively, the first sidelink UE and the second sidelink UE utilized a same service type in association with respective transmissions of the first transmission and the second transmission, the first sidelink UE and the second sidelink UE transmitted the first transmission and the second transmission to a same group in respective groupcast transmissions, a first distance between the first sidelink UE and the assisting sidelink UE is within a predefined distance range, a second distance between the second sidelink UE and the assisting sidelink UE is within the predefined distance range, a first reference signal received power (RSRP) measured at the assisting sidelink UE is within a predefined RSRP range, or a second RSRP measured at the assisting sidelink UE is within the predefined RSRP range.

Aspect 25: The method of aspect 24, wherein the transmission mode is at least one of: unicast, groupcast, or broadcast.

Aspect 26: The method of any of aspects 15 through 25, wherein the service type is at least one of: enhanced mobile broadband (eMBB), ultra-reliable and low latency communications (URLLC), or massive internet of things (mIOT).

Aspect 27: The method of any of aspects 15 through 26, wherein the method further comprises: sending the conflict indication to both the first sidelink UE and the second sidelink UE, sending the conflict indication to both the first sidelink UE and the second sidelink UE if the conflict indication is a post-conflict indication corresponding to the collision, sending the conflict indication to one of either the first sidelink UE or the second sidelink UE according to a predefined rule, or sending the conflict indication to one of either the first sidelink UE or the second sidelink UE if the conflict indication is a pre-conflict indication corresponding to the prospective collision.

Aspect 28: The method of aspect 27, wherein the predefined rule indicates that the conflict indication is sent to at least one of: the first sidelink UE or the second sidelink UE having a smaller Layer-1 source identifier (ID), the first sidelink UE or the second sidelink UE having a smaller Layer-1 destination ID, the first sidelink UE or the second sidelink UE having a lower traffic priority, the first sidelink UE or the second sidelink UE having a smaller determined distance from the assisting sidelink UE, the first sidelink UE or the second sidelink UE having a larger measured reference signal received power (RSRP) measured at the assisting sidelink UE, or the first sidelink UE or the second sidelink UE based on a random selection.

Aspect 29: An apparatus configured for wireless communication comprising at least one means for performing a method of any one of aspects 15 through 28.

Aspect 30: A non-transitory computer-readable medium storing computer-executable code, comprising code for causing an apparatus to perform a method of any one of aspects 15 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "obtain" is used to mean to get, to acquire, to select, to copy, to derive, and/or to calculate. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 3, 6, 7, and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Similarly, the construct "a and/or b" is intended to cover a; b; and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) configured as an assisting sidelink UE for inter-UE coordination of sidelink communications in a wireless communication network, comprising:
one or more transceivers;
one or more memories; and
one or more processors coupled to the one or more transceivers and the one or more memories, wherein the one or more processors are configured to:
sense a first transmission from a first sidelink UE, the first transmission identifying a first resource to be used by a second sidelink UE in a first response to the first transmission;
sense a second transmission from the second sidelink UE, the second transmission identifying a second resource to be used by the first sidelink UE in a second response to the second transmission;
send a conflict indication to at least one of the first sidelink UE or the second sidelink UE in response to determining the first resource conflicts with the second resource; and
send the conflict indication to one of either the first sidelink UE or the second sidelink UE according to a predefined rule, wherein the predefined rule indicates that the conflict indication is sent to the first sidelink UE or the second sidelink UE having a smaller Layer-1 source identifier (ID).

2. The UE of claim 1, wherein the one or more processors are configured to determine the first resource conflicts with the second resource by being further configured to detect if at least one of:
a complete overlap of respective time resources and respective frequency resources of the first resource and the second resource occurs in a slot common to the first resource and the second resource,
a partial overlap of the respective time resources and/or the respective frequency resources of the first resource and the second resource prospectively occur in the slot common to the first resource and the second resource, or
any respective portion of the first resource and the second resource prospectively occupies the slot common to the first resource and the second resource and the first sidelink UE and the second sidelink UE prospectively operate in a half-duplex mode.

3. The UE of claim 1, wherein the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

4. The UE of claim 1, wherein the one or more processors are further configured to:
detect a first destination identifier in the first transmission;
detect a second destination identifier in the second transmission; and
send the conflict indication, in response to determining the first resource conflicts with the second resource, if the first destination identifier and the second destination identifier are the same.

5. The UE of claim 1, wherein the one or more processors are further configured to:
detect a first source identifier (ID) and a first destination ID associated with the first transmission;
detect a second source ID and a second destination ID associated with the second transmission; and
send the conflict indication if in addition to determining the first resource conflicts with the second resource:
a first predetermined number of least significant bits (LSBs) of both the first source ID and the second destination ID are equal, or a second predetermined number of LSBs of both the second source ID and the first destination ID are equal.

6. The UE of claim 1, wherein the one or more processors are further configured to:
send the conflict indication if in addition to determining the first resource conflicts with the second resource, at least one of a following inter-UE coordination criteria is satisfied:
the first sidelink UE and the second sidelink UE utilized a same transmission mode to transmit the first transmission and the second transmission, respectively, or
the first sidelink UE and the second sidelink UE utilized a same service type in association with respective transmissions of the first transmission and the second transmission.

7. The UE of claim 6, wherein: the transmission mode is at least one of: unicast, groupcast, or broadcast.

8. The UE of claim 6, wherein the service type is at least one of:
enhanced mobile broadband (eMBB),
ultra-reliable and low latency communications (URLLC), or
massive internet of things (mIOT).

9. A method at a user equipment (UE) configured as an assisting sidelink UE for inter-UE coordination of sidelink communications in a wireless communication network, comprising:
sensing a first transmission from a first sidelink UE, the first transmission identifying a first resource to be used by a second sidelink UE in a first response to the first transmission;
sensing a second transmission from the second sidelink UE, the second transmission identifying a second resource to be used by the first sidelink UE in a second response to the second transmission;
sending a conflict indication to at least one of the first sidelink UE or the second sidelink UE in response to determining the first resource conflicts with the second resource; and
sending the conflict indication to one of either the first sidelink UE or the second sidelink UE according to a predefined rule, wherein the predefined rule indicates that the conflict indication is sent to the first sidelink UE or the second sidelink UE having a smaller Layer-1 source identifier (ID).

10. The method of claim 9, wherein the method further comprises:
determining the first resource conflicts with the second resource by detecting if at least one of:
a complete overlap of respective time resources and respective frequency resources of the first resource and the second resource prospectively occurs in a slot common to the first resource and the second resource,
a partial overlap of the respective time resources and/or the respective frequency resources of the first resource and the second resource prospectively occurs in the slot common to the first resource and the second resource, or
any respective portion of the first resource and the second resource prospectively occupies the slot common to the first resource and the second resource and the first sidelink UE and the second sidelink UE prospectively operate in a half-duplex mode.

11. The method of claim 9, wherein the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

12. The method of claim 9, wherein the method further comprises:
detecting a first destination identifier in the first transmission;
detecting a second destination identifier in the second transmission; and
sending the conflict indication, in response to determining the first resource conflicts with the second resource, if the first destination identifier and the second destination identifier are the same.

13. The method of claim 9, wherein the method further comprises:
detecting a first source identifier (ID) and a first destination ID associated with the first transmission;
detecting a second source ID and a second destination ID associated with the second transmission; and
sending the conflict indication if in addition to determining the first resource conflicts with the second resource:
a first predetermined number of least significant bits (LSBs) of both the first source ID and the second destination ID are equal, or
a second predetermined number of LSBs of both the second source ID and the first destination ID are equal.

14. The method of claim 9, wherein the method further comprises:
sending the conflict indication if in addition to determining the first resource conflicts with the second resource, at least one of a following inter-UE coordination criteria is satisfied:
the first sidelink UE and the second sidelink UE utilized a same transmission mode to transmit the first transmission and the second transmission, respectively, or
the first sidelink UE and the second sidelink UE utilized a same service type in association with respective transmissions of the first transmission and the second transmission.

15. The method of claim 14, wherein the transmission mode is at least one of: unicast, groupcast, or broadcast.

16. The method of claim 14, wherein the service type is at least one of:
enhanced mobile broadband (eMBB),
ultra-reliable and low latency communications (URLLC), or
massive internet of things (mIOT).

17. The UE of claim 1, wherein the predefined rule indicates that the conflict indication is sent to the first sidelink UE or the second sidelink UE having a lower traffic priority.

18. The method of claim 9, wherein the predefined rule indicates that the conflict indication is sent to the first sidelink UE or the second sidelink UE having a lower traffic priority.

19. A user equipment (UE) configured as an assisting sidelink UE for inter-UE coordination of sidelink communications in a wireless communication network, comprising:
one or more transceivers;
one or more memories; and one or more processors coupled to the one or more transceivers and the one or more memories, wherein the one or more processors are configured to:

sense a first transmission from a first sidelink UE, the first transmission identifying a first resource to be used by a second sidelink UE in a first response to the first transmission;

sense a second transmission from the second sidelink UE, the second transmission identifying a second resource to be used by the first sidelink UE in a second response to the second transmission;

send a conflict indication to at least one of the first sidelink UE or the second sidelink UE in response to determining the first resource conflicts with the second resource; and send the conflict indication to one of either the first sidelink UE or the second sidelink UE according to a predefined rule, wherein the predefined rule indicates that the conflict indication is sent to the first sidelink UE or the second sidelink UE having a smaller Layer-1 destination identifier (ID).

20. The UE of claim 19, wherein the one or more processors are configured to determine the first resource conflicts with the second resource by being further configured to detect if at least one of:

a complete overlap of respective time resources and respective frequency resources of the first resource and the second resource occurs in a slot common to the first resource and the second resource, a partial overlap of the respective time resources and/or the respective frequency resources of the first resource and the second resource prospectively occur in the slot common to the first resource and the second resource, or any respective portion of the first resource and the second resource prospectively occupies the slot common to the first resource and the second resource and the first sidelink UE and the second sidelink UE prospectively operate in a half-duplex mode.

21. The UE of claim 19, wherein the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

22. The UE of claim 19, wherein the one or more processors are further configured to:

detect a first destination identifier in the first transmission;

detect a second destination identifier in the second transmission; and send the conflict indication, in response to determining the first resource conflicts with the second resource, if the first destination identifier and the second destination identifier are the same.

23. The UE of claim 19, wherein the one or more processors are further configured to:

detect a first source identifier (ID) and a first destination ID associated with the first transmission;

detect a second source ID and a second destination ID associated with the second transmission; and send the conflict indication if in addition to determining the first resource conflicts with the second resource:

a first predetermined number of least significant bits (LSBs) of both the first source ID and the second destination ID are equal, or a second predetermined number of LSBs of both the second source ID and the first destination ID are equal.

24. A method at a user equipment (UE) configured as an assisting sidelink UE for inter-UE coordination of sidelink communications in a wireless communication network, comprising:

sensing a first transmission from a first sidelink UE, the first transmission identifying a first resource to be used by a second sidelink UE in a first response to the first transmission;

sensing a second transmission from the second sidelink UE, the second transmission identifying a second resource to be used by the first sidelink UE in a second response to the second transmission;

sending a conflict indication to at least one of the first sidelink UE or the second sidelink UE in response to determining the first resource conflicts with the second resource; and sending the conflict indication to one of either the first sidelink UE or the second sidelink UE according to a predefined rule, wherein the predefined rule indicates that the conflict indication is sent to the first sidelink UE or the second sidelink UE having a smaller Layer-1 destination identifier (ID).

25. The method of claim 24, wherein the method further comprises:

determining the first resource conflicts with the second resource by detecting if at least one of:

a complete overlap of respective time resources and respective frequency resources of the first resource and the second resource prospectively occurs in a slot common to the first resource and the second resource, a partial overlap of the respective time resources and/or the respective frequency resources of the first resource and the second resource prospectively occurs in the slot common to the first resource and the second resource, or any respective portion of the first resource and the second resource prospectively occupies the slot common to the first resource and the second resource and the first sidelink UE and the second sidelink UE prospectively operate in a half-duplex mode.

26. The method of claim 24, wherein the first resource is a first preferred resource identified to the UE in a first inter-UE coordination message in a first second-stage sidelink control information (SCI-2) received by the UE from the first sidelink UE and the second resource is a second preferred resource identified to the UE in a second inter-UE coordination message in a second SCI-2 received by the UE from the second sidelink UE.

27. The method of claim 24, wherein the method further comprises:

detecting a first destination identifier in the first transmission;

detecting a second destination identifier in the second transmission; and sending the conflict indication, in response to determining the first resource conflicts with the second resource, if the first destination identifier and the second destination identifier are the same.

28. The method of claim 24, wherein the method further comprises:

detecting a first source identifier (ID) and a first destination ID associated with the first transmission;

detecting a second source ID and a second destination ID associated with the second transmission; and sending the conflict indication if in addition to determining the first resource conflicts with the second resource:
- a first predetermined number of least significant bits (LSBs) of both the first source ID and the second destination ID are equal, or
- a second predetermined number of LSBs of both the second source ID and the first destination ID are equal.

* * * * *